(12) United States Patent
Douglas et al.

(10) Patent No.: US 10,901,481 B2
(45) Date of Patent: Jan. 26, 2021

(54) SYSTEMS AND METHODS FOR ELASTIC DELIVERY, PROCESSING, AND STORAGE FOR WEARABLE DEVICES BASED ON SYSTEM RESOURCES

(71) Applicant: BioMech Sensor LLC, Midlothian, VA (US)

(72) Inventors: John Douglas, Richmond, VA (US); Frank Fornari, Naples, FL (US); Jeff Rowberg, Salem, VA (US)

(73) Assignee: BioMech Sensor LLC, Midlothian, VA (US)

( * ) Notice: Subject to any disclaimer, the term of this patent is extended or adjusted under 35 U.S.C. 154(b) by 0 days.

(21) Appl. No.: 16/752,096

(22) Filed: Jan. 24, 2020

(65) Prior Publication Data

US 2020/0241621 A1    Jul. 30, 2020

Related U.S. Application Data

(63) Continuation of application No. 16/257,662, filed on Jan. 25, 2019, now Pat. No. 10,545,558.

(51) Int. Cl.
*G06F 1/32* (2019.01)
*G06F 1/16* (2006.01)
*H04B 17/318* (2015.01)
*G06F 1/3212* (2019.01)

(52) U.S. Cl.
CPC ............ *G06F 1/3212* (2013.01); *G06F 1/163* (2013.01); *H04B 17/318* (2015.01)

(58) Field of Classification Search
CPC .................................... G06F 1/32; G06F 1/26
See application file for complete search history.

(56) References Cited

U.S. PATENT DOCUMENTS

| | | | | |
|---|---|---|---|---|
| 5,418,720 | A  * | 5/1995 | Randel | H04L 1/20 |
| | | | | 702/170 |
| 10,559,200 | B1 * | 2/2020 | Langley | G06F 1/3296 |
| 2006/0007870 | A1 | 1/2006 | Roskowski et al. | |
| 2010/0120406 | A1 | 5/2010 | Banga et al. | |
| 2011/0002361 | A1 | 1/2011 | Woollett et al. | |
| 2013/0013852 | A1 | 1/2013 | Hou et al. | |
| 2015/0057967 | A1 * | 2/2015 | Albinali | A61B 5/1118 |
| | | | | 702/150 |
| 2015/0220109 | A1 | 8/2015 | von Badinski et al. | |

(Continued)

*Primary Examiner* — Phil K Nguyen
(74) *Attorney, Agent, or Firm* — Finnegan, Henderson, Farabow, Garrett & Dunner LLP

(57) ABSTRACT

The present disclosure relates to systems and methods for elastic delivery, processing, and storage for wearable devices based on system resources. For example, a wearable apparatus may have at least one battery; at least one sensor configured to measure at least one property associated with a user of the wearable apparatus; at least one memory storing measurements from the at least one sensor and instructions; at least one transmitter configured to send data to a device remote from the wearable apparatus; and at least one processor configured to execute the instructions to: receive, from the at least one battery, an indicator of a charge; and based on the received indicator, sending a command to the at least one sensor to operate in a low-power mode or a high-power mode, the low-power mode having. a lower sampling rate than the high-power mode.

18 Claims, 16 Drawing Sheets

(56) References Cited

U.S. PATENT DOCUMENTS

| | | |
|---|---|---|
| 2015/0220131 A1* | 8/2015 | Johansson ............. G06F 1/3215 |
| | | 713/323 |
| 2016/0057707 A1 | 2/2016 | Semersky et al. |
| 2016/0226217 A1 | 8/2016 | Jia et al. |
| 2016/0226985 A1 | 8/2016 | Yoon et al. |
| 2016/0247437 A1* | 8/2016 | Choi .................... G09G 3/2003 |
| 2017/0056664 A1 | 3/2017 | Kane et al. |
| 2017/0075316 A1* | 3/2017 | Berdinis ................ G04G 19/12 |
| 2017/0127354 A1* | 5/2017 | Garland ............ H04W 52/0274 |
| 2018/0293200 A1 | 10/2018 | Hong et al. |

\* cited by examiner

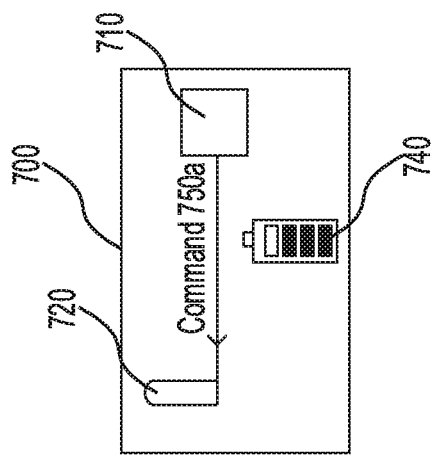
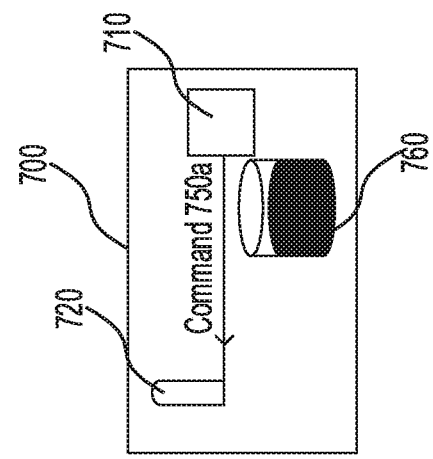
FIG. 7A
FIG. 7B
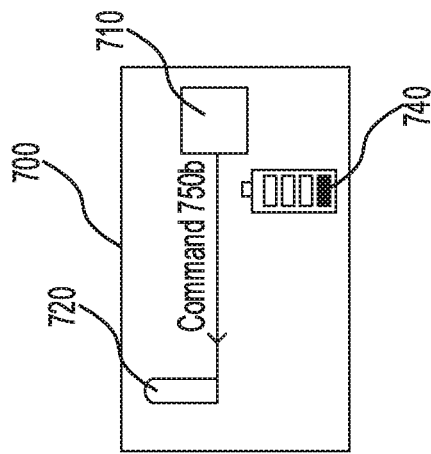
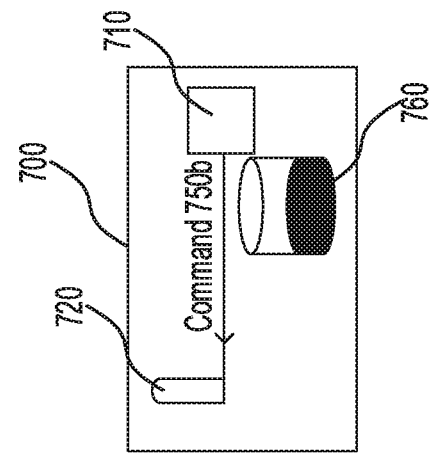

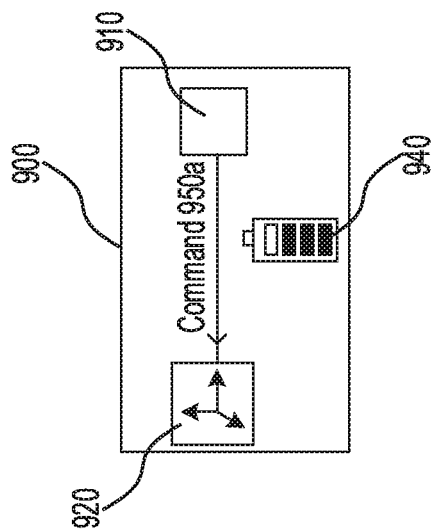
*FIG. 9A*
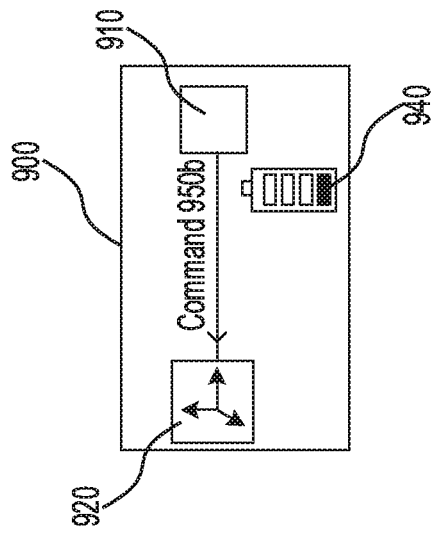
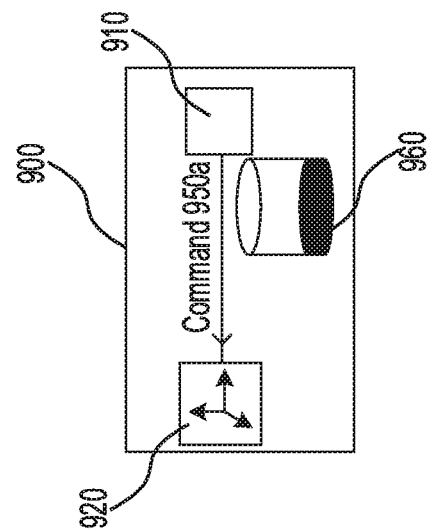
*FIG. 9B*
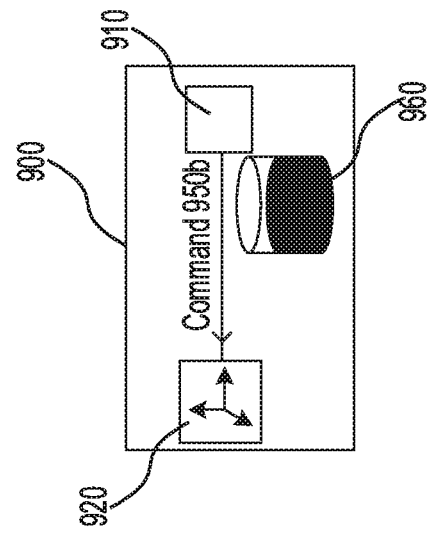

SYSTEMS AND METHODS FOR ELASTIC DELIVERY, PROCESSING, AND STORAGE FOR WEARABLE DEVICES BASED ON SYSTEM RESOURCES

CROSS-REFERENCE TO RELATED APPLICATIONS

This application is a continuation of U.S. patent application Ser. No. 16/257,662, filed on Jan. 25, 2019 (now allowed), the disclosure of which is expressly incorporated herein by reference in its entirety.

TECHNICAL FIELD

This disclosure relates generally to data sampling and transmission, and more particularly to methods and systems for adjustable sampling and transmission rates depending on battery power and/or signal strength.

BACKGROUND

Wearable devices continue to increase in popularity. For example, wrist-worn fitness trackers record and display a user's steps taken over the course of a day. Other devices record accelerometer measurements and alert a medical professional to a possible fall event for older patients.

However, wearable devices usually contain limited on-device storage and require transmission of measurements to a remote device. This transmission, however, is not always feasible due to low battery power, poor signal strength, or other environmental factors. In addition, the transmission may not be necessary, for example, if there is sufficient on-device storage. Similarly, most conventional wearable devices sample measurements at a constant rate. However, this is not always feasible due to low battery power and is not always necessary, for example, if the user is not engaged in activity requiring monitoring.

SUMMARY

Disclosed embodiments may include methods, systems, and computer-readable media to adjust sampling rates and/or transmission rates in accordance with one or more environmental variables. Accordingly, embodiments of the present disclosure provide technical solutions to the technical problems with conventional data sampling and transmission, e.g., by wearable apparatuses. For example, embodiments of the present disclosure may result in more effective use of battery power and use of local storage on a wearable apparatus.

In one embodiment, a wearable apparatus having an adjustable transmission rate may comprise at least one battery; at least one sensor configured to measure at least one property associated with a user of the wearable apparatus; at least one memory storing measurements from the at least one sensor and instructions; at least one transmitter configured to send data to a device remote from the wearable apparatus; and at least one processor configured to execute the instructions to perform operations. The operations may comprise receiving, from the at least one battery, an indicator of a charge; and based on the received indicator, sending a command to the at least one transmitter to operate in a low-power mode or a high-power mode. The low-power mode may have at least one of a lower range of communication or a lower transmission rate than the high-power mode.

In one embodiment, a wearable apparatus having an adjustable sampling rate may comprise at least one battery; at least one sensor configured to measure at least one property associated with a user of the wearable apparatus; at least one memory storing measurements from the at least one sensor and instructions; at least one transmitter configured to send data to a device remote from the wearable apparatus; and at least one processor configured to execute the instructions to perform operations. The operations may comprise receiving, from the at least one battery, an indicator of a charge; and based on the received indicator, sending a command to the at least one sensor to operate in a low-power mode or a high-power mode. The low-power mode may have a lower sampling rate than the high-power mode.

In one embodiment, a wearable apparatus having an adjustable transmission rate may comprise at least one battery; at least one sensor configured to measure at least one property associated with a user of the wearable apparatus; at least one memory storing measurements from the at least one sensor and instructions; at least one transmitter configured to send data to a device remote from the wearable apparatus; and at least one processor configured to execute the instructions to perform operations. The operations may comprise receiving, from the at least one battery, an indicator of a charge; based on measurements of the at least one property from the at least one sensor, determining an activity level of the user; and based on the received indicator and determined activity level, sending a command to the at least one transmitter to operate in a low-power mode or a high-power mode. The low-power mode may have at least one of a lower range of communication or a lower transmission rate than the high-power mode. The operations may further comprise sending a command to the at least one sensor to operate in a low-power mode or a high-power mode. The low-power mode may have a lower sampling rate than the high-power mode.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 7A illustrates an example of variable transmission rates in response to battery power in accordance with some embodiments of the present disclosure.

FIG. 7B illustrates an example of variable transmission rates in response to available storage space in accordance with some embodiments of the present disclosure.

FIG. 9A illustrates an example of variable sampling rates in response to battery power in accordance with some embodiments of the present disclosure.

FIG. 9B illustrates an example of variable sampling rates in response to available storage space in accordance with some embodiments of the present disclosure.

DETAILED DESCRIPTION

Figure 1:
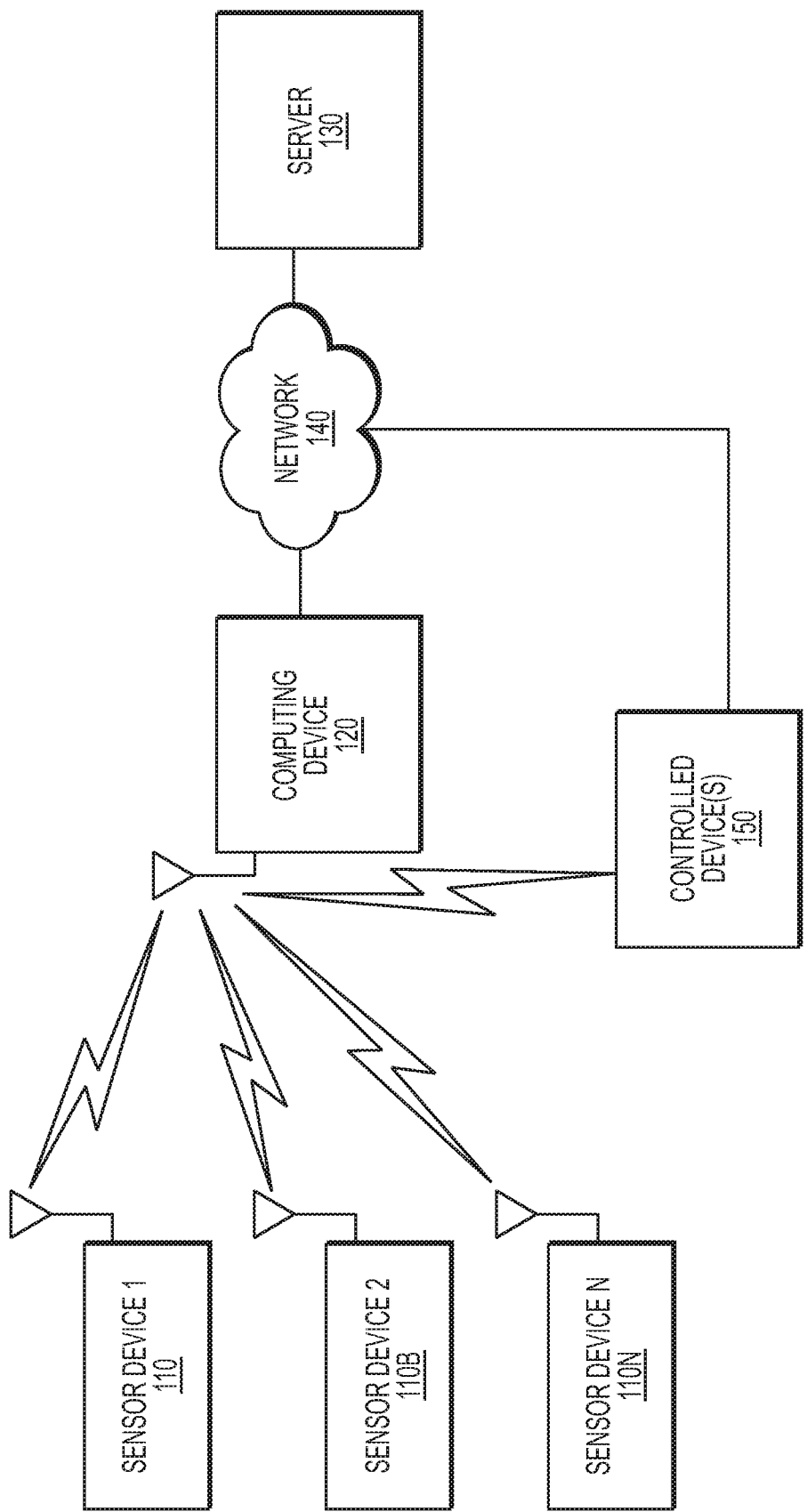
FIG. 1 illustrates an exemplary real-time data acquisition, analysis, and feedback system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Disclosed embodiments generally relate to systems and methods of acquiring data in real-time, analyzing the data, and providing real-time feedback to the user. Disclosed embodiments may track, quantify, and evaluate body motion of a user and/or equipment or machinery. For example, while moving or exercising, disclosed systems and methods may process sensor data quantifying clinically relevant characteristics of a running stride of a user, as well as evaluate the data by comparing it to simultaneously received data from another user, prior sets of data from the user or other users, and/or model (also referred to as "template") sets of data for a desired running stride. In this example, a user may receive feedback mid-stride or mid-repetition that the movement or action fails to conform to the template set of data. For a single motion or exercise session or for discrete motions performed throughout a session, disclosed systems may provide a quantified measurement of the motion, such as a normalized "score" or percentage deviation between the test and template data sets. Further, over time, disclosed systems may automatically adapt templates based on progress from prior measurements and long-term goals, making sure captured data from a user's motion or motions matches desired criteria, such as orientation, speed, and/or range of motion, for example, Over time, disclosed systems may allow for cloud-based review of progress by the user or a third party (e.g., a healthcare professional), highlighting problematic results that may benefit from specialized treatment, which may include modifications to exercises or instructive motions, different motion instructions altogether, a varied combination of regimens, medication, and/or surgical treatment.

Existing systems and methods may only track a single metric over time. Disclosed embodiments may offer the improved functionality of accounting for and correlating different variables associated with an activity. Disclosed embodiments may offer an improved solution by correlating different tracked data over time and recognizing relevant trends or patterns in the data that may not be apparent without multidimensional correlation.

Existing systems further lack the capability to provide real-time feedback. Disclosed embodiments may offer an improved solution by providing an automatic, immediate, and clinically relevant indication to a user that acquired data fails to match desired characteristics, as well as receiving manual feedback and providing it to the user in real-time. For example, disclosed embodiments may provide real-time feedback to users based on pattern matching algorithms. When received sensor data matches a predefined rule, the sensor or an associated device may provide an indication to the user (e.g., visually, audibly, and/or tangibly). In other examples, real-time data is provided to a third party (e.g., a coach, trainer, doctor, healthcare professional), offering the third party the option to input feedback that systems then transmit to a user in real-time. The relevant real-time feedback, automatic and/or manual, may allow the user to adapt mid-activity, allowing for users to more effectively practice physical movements, for example.

Further, existing systems fail to track changes over time. Disclosed embodiments may offer the improvement of highlighting clinically relevant trends over time between different data profiles. Further, disclosed embodiments may track clinically relevant progress, such as a range of motion or deviation from a template profile. For example, systems and methods may determine that a deviation in a user's walking stride has digressed (e.g., a limp in a user's walk) at a particular magnitude or duration that may present a significant health risk or long-term problem. While such an example may be apparent to the user, exemplary disclosed systems may also uncover latent changes in a user's well-being, such as changes in blood-glucose levels, blood pressure, heart rate, oxidation levels, and hydration, for example. Embodiments may correlate such clinically relevant latent characteristics of a user's body with other activities to note trends of problematic activity. Systems and methods may alert the user and/or a healthcare provider. Moreover, insurance providers may use disclosed systems and methods to offer adapted insurance options tailored to an individual, such as decreasing one's rates for maintaining a lower blood pressure through proper medication, diet, and exercise, or advocating for surgical intervention prior to complete failure of some physiological aspect that would otherwise hamper recovery.

Disclosed embodiments may improve on existing systems by adapting goals, such as to reach a desired outcome and/or based on current results. For example, a user's progress may increase or decrease based on environmental factors and the user's unique physiology. When user performance exceeds planned or expected progress, disclosed embodiments may adapt templates to be more aggressive (e.g., higher range of motion, faster, stronger, longer distances, more repetitions, tighter tolerances to a template). However, if a user's progress stagnates or declines, disclosed embodiments may allow for a more relaxed adaptation of a user's template.

Disclosed embodiments may provide one or more of these improvements. Additional improvements may be present in the embodiments but not explicitly listed here. Further, embodiments need not meet one or more of these outlined benefits to necessarily provide advancement over current technology. Additional advancements are discussed throughout this disclosure.

Disclosed embodiments may include generating, utilizing, and/or manipulating a data profile. In some embodiments, a data profile may be a multidimensional data stream over time or a portfolio of multiple time-synchronized streams of data. A data profile may correlate two or more time-dependent sets of data, such as data received from various sensors. For example, a data profile may represent acceleration in three axes over time. In another example, a data profile may include an accumulated magnitude of movement (e.g., an activity measurement metric) and a recorded blood glucose level over time, or a heartrate, blood pressure, muscle operation, and an activity measurement metric over time. In still further examples, data from electromyography (EMG) sensors, temperature sensors, elevation sensors, light intensity sensors, pressure sensors, force sensors, and electrical sensors may be correlated with health information, such as blood-glucose levels, heartrate, blood pressure, oxygen saturation levels, body temperature, respiratory rate, and/or gait. Other types of data streams may be generated using the sensors and types of data discussed in this specification, consistent with disclosed embodiments. Correlations of performance or health related to elevation, light intensity, temperature, humidity or other external factors are expected.

Disclosed embodiments may include generating, utilizing, and/or manipulating a motion profile. A motion profile may be a data profile that describes the motion of an object, person, and/or extremity over time. A motion profile may include a timewise multidimensional record of motion. For example, motion profiles may include three-dimensional acceleration data, three-axis orientation data, three-axis angular velocity data, and/or three-axis gravitational information over time. In some embodiments, the acceleration and/or orientation data may include data for less than three dimensions, such as single or dual axis acceleration and/or orientation data. The motion profile may combine unique signals of the same motion, such as correlating linear acceleration and angular acceleration.

Based on the motion profile, disclosed embodiments may include rendering a graphical representation of a corresponding motion in space. In the example of a three-dimensional motion profile, disclosed embodiments may include rendering a line in a three-axis space illustrating the path of the object. In still further embodiments, the rendered display may include an animation showing an icon oriented (e.g., based on orientation data) and moving along the path at a rate commensurate with the acceleration data of the motion profile. Such data may also be rendered alongside or overlaid on top of synchronized captured video data.

Disclosed embodiments may include comparing two or more motion profiles or, more generally, data profiles. In some embodiments, systems and methods may determine the magnitude of the differences between two profiles. Such differences may indicate how closely two sets of data match, such as two swings of a golf club. The differences may be quantified using different calculations. In one example, disclosed embodiments may sum the aggregate difference of a fixed period of time (e.g., integrate the differences). Some embodiments may normalize the integrated amount on a per unit time basis. Additionally or alternatively, disclosed embodiments may include comparing two profiles by determining that at a predefined set of points in time (e.g., one or more timewise data points) the two profiles differed by more than a threshold amount (e.g., a predefined threshold or an automatically adjusted threshold).

Disclosed embodiments may include utilizing event models to recognize data profiles, motion profiles, or portions of either that match particular criteria. These criteria may include simple thresholds or complex curve-matching algorithms. In the example of complex curve fitting, an event model may be defined by a specified contour for particular variables of a profile, such that the y-axis displacement (e.g., ordinary least squares difference) or orthogonal distance (e.g., total least squares difference) is below a threshold amount. The amount may be normalized based on the type of application or magnitude of the test profile data.

Disclosed embodiments may use one or more of these concepts individually or in combination as discussed below regarding the figures.

FIG. 1 illustrates an exemplary real-time data quantification, acquisition, analysis, and feedback system 100 according to some embodiments of the present disclosure. System 100 may include one or more sensor devices (110, 110B 110N), computing device 120, controlled device(s) 150, network 140, and server 130.

System 100 may include one or more sensor devices to aggregate sensor data. Sensor devices 110, 110B, and 110N represent the one or more sensor devices that provide data to system 100. Each of the shown sensor devices may include the same sensor capabilities or different capabilities. For example, sensor 110 may include an inertial measurement unit, while sensor device 110B provides pressure data (e.g., from the grip of a club or racket, or from an insole). In a differing example, the entire sensor shown could only include inertial measurement units, but could be located on different people, or on different points of a single person (e.g., wrist, knee, or ankle). Sensors may provide various sensed data to system 100 as further discussed below.

System 100 may include computing device 120. In some embodiments, computing device 120 may be a general purpose computer, tablet device, smartphone, or smart watch. Computing device 120 may include a processor, memory (e.g., RAM, flash memory, and/or a hard disc), various wired and wireless interfaces (e.g., Bluetooth, IEEE 802.11, Ethernet, USB, USB-C, and/or proprietary ports such as Apple Lightning), input devices (e.g., touchscreen, keyboard, mouse), and a display. Computing device 120 may operate programmable instructions stored locally or remotely to perform disclosed processes.

Computing device 120 may interact with one or more sensor devices. Computing device 120 may receive sensor data from sensor device 110, sensor device 110B, and/or sensor device 110N. For example, sensor device 110 may send, in real-time, data perceived from sensors. Sensor data may be high-resolution data, and the connection between sensor device 110 and computing device 120 may be a high-bandwidth connection, such as a Bluetooth "classic" wireless connection. While such high-bandwidth wireless technologies may use more power than alternatives (e.g., Bluetooth "low energy"), the increased data resolution that may be used by system 100 may require higher bandwidth wireless interfaces.

System 100 may include controlled device(s) 150 that perform functions based on received instructions. For example, controlled device(s) 150 may include output devices, such as remote displays, speakers, and tactile engines that provide feedback to a user of sensor device 110. These types of controlled devices may provide a status indicator to the user based on the sensor data, such as informing the user that the sensor device is providing a data profile that meets expectations by displaying a green light, playing a positive tone, or tapping the user via a worn tactile engine.

In another example, controlled device(s) 150 may include devices that affect a user's workout environment. For example, controlled device(s) may include a fan, air conditioning system, or workout equipment. In this example, computing device 120 may transmit instructions to increase a fan speed and/or activate an air conditioner responsive to determining that the sensor device 110 indicates that a user's body temperature exceeds a healthy threshold level.

In still other examples, controlled device(s) 150 may include medical devices, such as insulin pumps, pacemakers, cardiac defibrillators, gastric stimulators, deep brain neurostimulators, and/or cochlear implants. In one example, computing device 120 may transmit a control signal to an insulin pump to vary insulin dosage based on data from sensor device 110 indicating higher levels of activity (e.g., a data profile matching an event model for intensifying activity). In another example, computing device 120 may transmit a control signal to a medication pump to provide medication to prevent or greatly lessen Parkinsonian tremors.

System 100 may include network 140. In some embodiments, network 140 may be a wired and/or wireless network. For example, network 140 may be a LAN, WAN, WLAN, or the Internet. System 100 may use network 140 to connect various devices. For example, computing device 120 may connect to server 130, controlled device(s) 150, and/or sensor device 110 using the network. Alternatively, as depicted, computing device 120 may interface directly with sensor device 110 and/or controlled device(s) 150. For example, computing device 120 may form its own wireless access point to connect to other devices.

System 100 may include server 130 to provide networked storage and analysis. Server 130 may be a networked computer. Server 130 may include a central processing unit, such as at least one data processor that executes program components for executing user- or system-generated requests. The processor may include specialized processing units or a general purpose microprocessor.

Server 130 may facilitate network-based (e.g., "cloud") storage and data interaction. For example, computing device 120 may transmit data profiles and the underlying raw data to server 130 for storage. In an embodiment, server 130 may analyze data profiles over time and provide feedback based on changes. Server 130 may transmit notifications (e.g., send email, upload data, revise websites, update databases) based on analysis of data.

In some embodiments, server 130 may serve as a portal to allow users to interact with archived data profiles and raw data. For example, server 130 may provide a graphical user interface that presents data profiles organized by particular categories, dates, or types.

Figure 2:
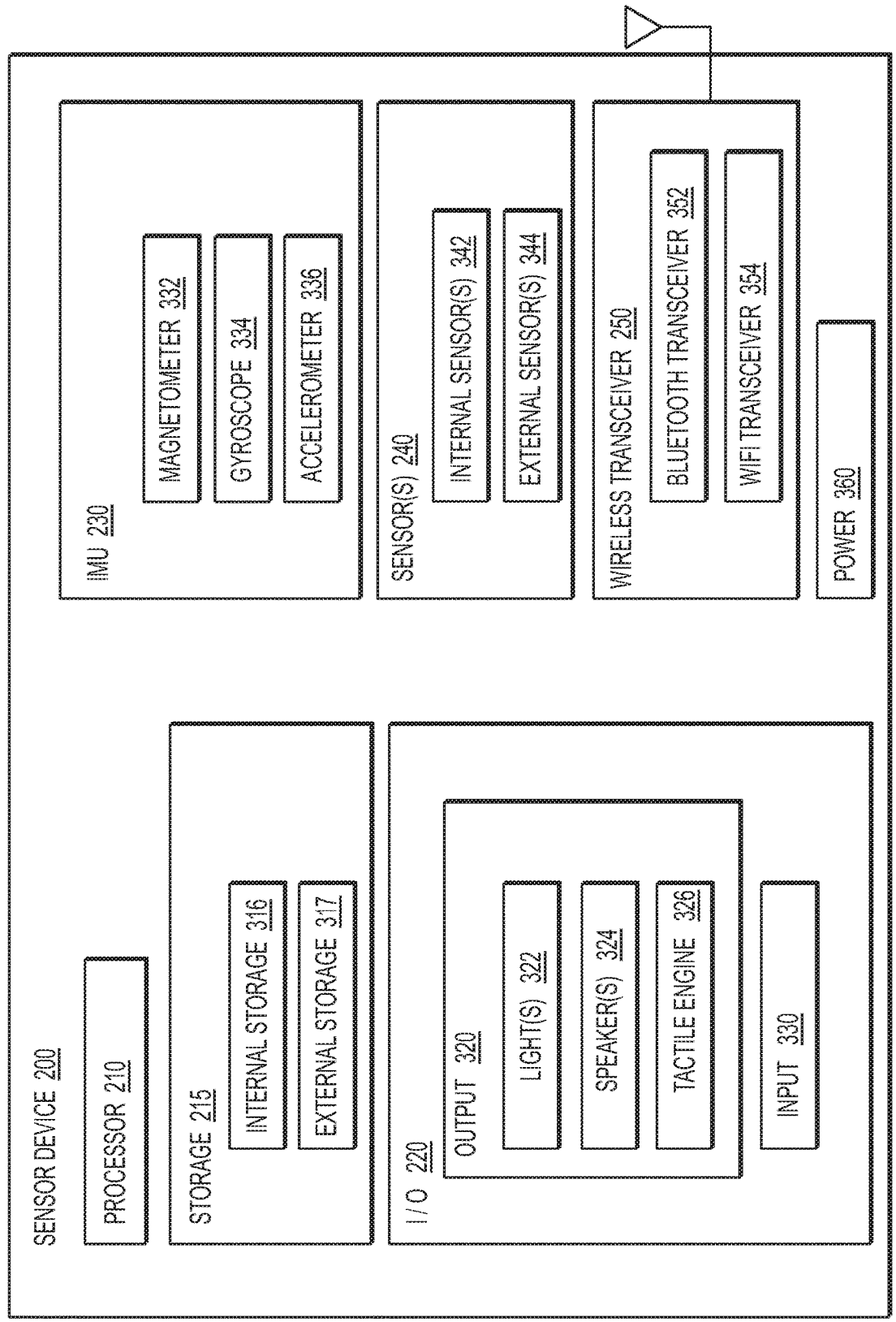
FIG. 2 is a functional block diagram of a sensor device according to some embodiments of the present disclosure.

FIG. 2 is a functional block diagram of sensor device 200 according to some embodiments of the present disclosure. Sensor device 200 may be an example of sensor device 110, consistent with disclosed embodiments. Sensor device 200 may include processor 210, storage 215, input-output 220, IMU 230 (inertial measurement unit), sensor(s) 240, wireless transceiver 250, and/or power 360.

In some embodiments, processor 210 may be a general purpose processor, programmable microcontroller, programmable processor (e.g., a field-programmable gate array (FPGA) or complex programmable logic device (CPLD)), or an application specific integrated circuit (ASIC).

In some embodiments, storage 215 may include internal storage 316 and/or external storage 317. Internal storage 316 may include, for example, on-board memory, such as flash memory or RAM. External storage may include, for example, removable memory media, such as compact flash cards, secure digital cards, memory sticks, optical disks, and the like. In some embodiments, storage 215 may include non-transitory computer-readable media that stores instructions that, when executed by a process (e.g., processor 210), cause the processor to perform disclosed functions and processes.

Input-output 220 may include output 320 and input 330. In some embodiments, output 320 may include lights 322 (e.g., on or more LEDs, an LCD display, a laser, a projector), speaker(s) 324 (e.g., a piezoelectric speaker, a buzzer, a siren, a loudspeaker), and tactile engine 326 (e.g., vibrators, haptic feedback mechanisms). Lights 322 may include lights on various surfaces and different angles of sensor device 200.

Input 330 may allow a user to activate and interact with sensor device 200. In some embodiments, input 330 may include a physical input mechanism (e.g., button, switch, capacitive interface) or a way to receive input (e.g., an infrared receiver, an optical receiver, a USB or serial port). Physical input mechanisms, for example, may allow the user to turn sensor device 200 on and off, synchronize with a computing device, and/or change modes.

Figure 3B:
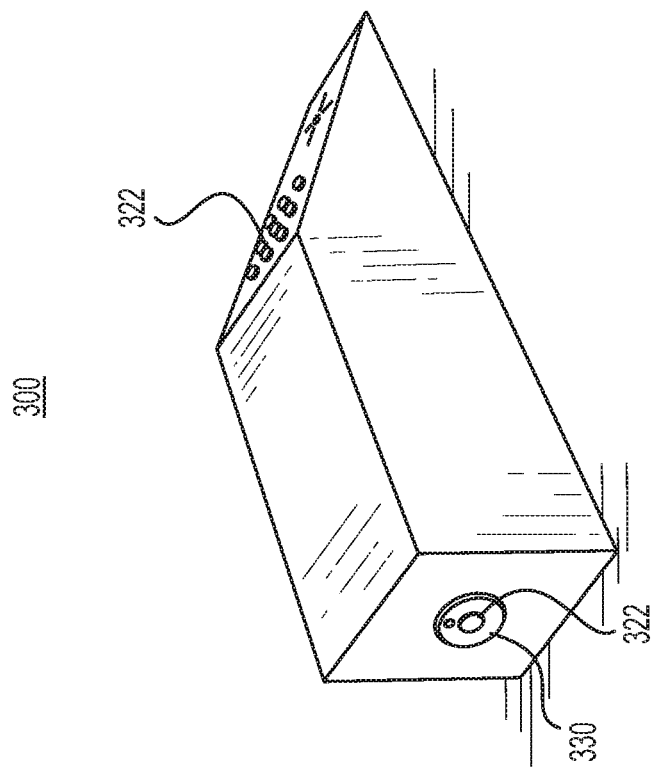
FIGS. 3A and 3B illustrate views of a sensor device in accordance with some embodiments of the present disclosure.
Figure 3A:
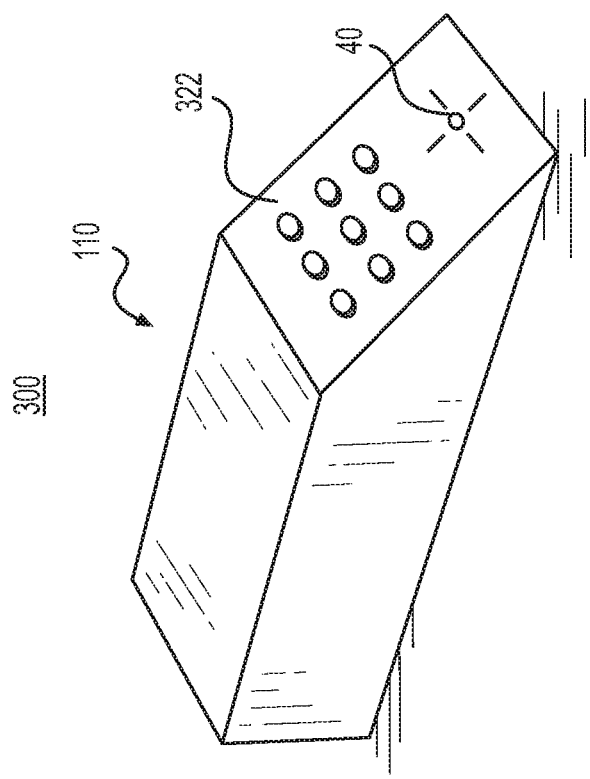

As an example of types of arrangements of output 320 and input 330, FIGS. 3A and 3B illustrate views of sensor device 300 (e.g., an exemplary sensor device 110 and/or sensor device 200) in accordance with some embodiments of the present disclosure. In some embodiments, sensor device 300 may include a combination of lights, such as an LED array. For example, as shown, sensor device 300 includes an angled face with a grid of lights 322 (e.g., LEDs). This grid may be programmed to display low resolution patterns or provide greater intensity light as a single unit. On another face, sensor device 300 may include a light combined with an input device (e.g., light(s) 322 combined with input 330 on the opposite face of sensor device 300). For example, input 330 may be a physical button that a user may press to interact with sensor device 300. Various depression patterns (e.g., long-press, double-press, triple-press, quick-press) may be used to indicate different input codes. For example, a user may long press the button to initiate pairing with a computing device 120. In another example, a user may tap a code corresponding to a tag that the user wishes to associate with a particular set of data collected. The user may, for example, triple tap input 330 before and/or after performing a motion to indicate that system 100 should flag the corresponding motion profile as an "ideal" or template motion, or a particular motion of interest for further analysis (e.g., bookmarking). While input 330 is shown as a single button, additional buttons (not shown) may be placed adjacent to input 330 or on different faces of sensor device 300. In addition to physical buttons, sensor device 300 may include receiver 40 to receive infrared or optical input, for example.

Returning to FIG. 2, in some embodiments, sensor device 200 may include IMU 230 to capture multi-dimensioned acceleration and orientation data. IMU 230 may include magnetometer 332, gyroscope 334, and/or accelerometer 336. In certain embodiments, processor 210 may sample IMU acceleration and orientation data at a rate of 100 samples per second. In some embodiments multiple IMU devices may be "stacked" and then time sliced to permit N Factor sample rate increases such that two such devices can generate 200 samples per second or even more.

In some embodiments, sensor device may include multiple instances of IMU 230 as a redundant measure to filter outlying measurements. For example, processor 210 may receive three-axis acceleration data from two or more IMUs. Processor 210 may average the acceleration data to increase accuracy, or when there are three or more IMUs, processor 210 may not make use of the highest and lowest readings, averaging the remaining readings to reduce measurement inaccuracies.

Sensor device 200 may also include various sensor(s) 240. In some embodiments, sensors may be embedded in sensor device 200 as internal sensor(s) 342. For example, a temperature sensor, light intensity sensor, humidity sensor, elevation sensor, and/or microphone may be housed within sensor device 200 and may interface directly with processor 210. In some embodiments, sensors may interface with sensor device 200 through a port or physical interface as external sensor(s) 344. For example, through a USB or serial connection, sensor device 200 may receive data from off-board sensors, such as biopotential telemetry measurement devices (e.g., electrocardiogram (ECG), electroencephalogram (EEG), electromyogram (EMG) data), optical input devices (e.g., cameras, rangefinders), and/or smartphone sensors (e.g., smartphone GPS, elevation, time, weather, sound, light). In some embodiments, external sensor(s) 344 may be used to verify data from internal sensor(s) 342.

Sensor device 200 may include wireless transceiver 250. Transceiver 250 may facilitate communication with computing device 120, network 140, and/or controlled device(s) 150. In some embodiments, transceiver 250 may include Bluetooth transceiver 352 and/or Wi-Fi transceiver 354. In an example, Bluetooth transceiver 352 may be a Bluetooth "classic" transceiver, rather than a Bluetooth "low energy" transceiver in order to provide increased bandwidth to transmit high resolution sensor data (e.g., to computing device 120) in real-time. In another example, Wi-Fi transceiver 354 may be an IEEE 802.11a/b/g/n/x transceiver. Additional wired and/or wireless standards may be used consistent with the bandwidth requirements of the disclosed systems and processes.

Sensor device 200 may include power 360 to provide electricity to components, such as processor 210 and storage 215, among other elements. In some embodiments, power 360 may include a direct current power source, such as a battery. For example, power 360 may include a lithium ion polymer (LiPo) battery, nickel-metal hydride (NiMH) battery, and/or a nickel-cadmium battery. When power 360 includes a battery, power 360 may further include recharging circuitry, such as an electrical port, a removable battery, and/or inductive charging circuitry.

FIGS. 4A, 4B, 4C, and 4D illustrate different equipment with a sensor device according to some embodiments of the present disclosure.

Figure 4A:
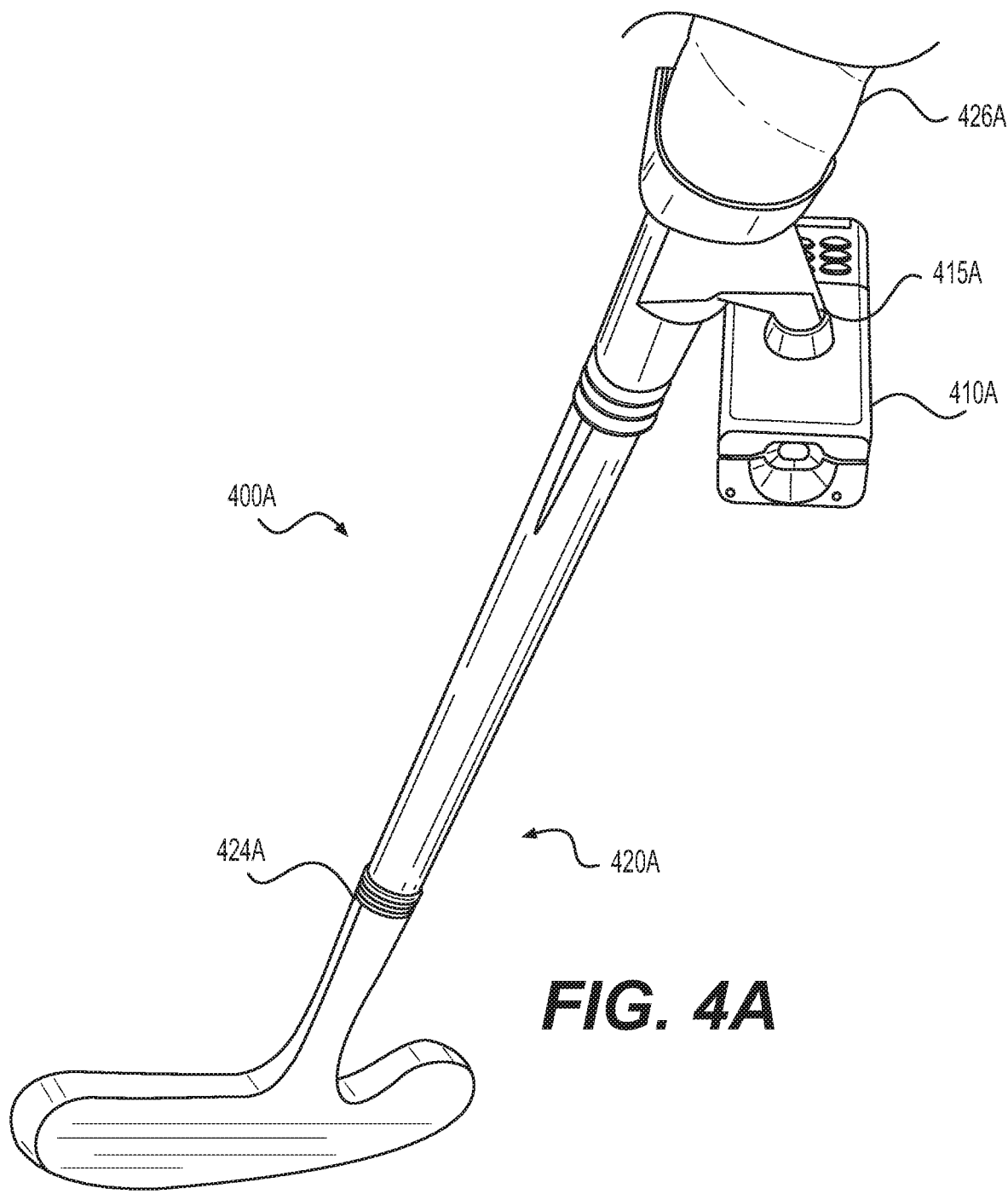
FIGS. 4A, 4B, 4C, and 4D illustrate different equipment with a sensor device in accordance with some embodiments of the present disclosure.

Turning to FIG. 4A, system 400A includes golf club 420A with sensor device 410A. Golf club 420A may be a conventional golf club, such as a putter, driver, or pitching wedge. Golf club 420A may include head 424A and grip 426A.

Sensor device 410A (e.g., sensor 110) may attach to golf club 420A. In some embodiments, mount 415A may be used to secure sensor device 410A to golf club 420A. While a golf putter is shown, additional club heads, such as drivers, fairway woods, hybrid clubs, irons, and pitching wedges may all serve as golf club 420A. As shown, sensor device 410A may connect to golf club 420A at the base of grip 426A. This positioning of sensor device 410A may advantageously provide more accurate inertial data of the swing motion. For purposes of this discussion, "swing" may refer to the motion of teeing off with a driver, swinging a nine iron on a fairway, and/or putting with a putter, for example. Additionally, placement at the base of grip 426A may allow users to swing golf club 420A without sensor device 410A interfering with their line of sight. However, in other embodiments, sensor device 410A may be mounted at other position on golf club 420A. In still other embodiments, multiple sensor devices may be mounted at different positions of golf club 420A, such as near head 424A, along the shaft, and/or at various locations on grip 426A.

In an embodiment, grip 426A may capture pressure data through the use of pressure sensors. For example, grip 426A may include one or more embedded, attached, or otherwise added pressure sensors. The pressure sensors may record the pressure of the user's grip during use of the club. Such data may be useful in providing relevant, real-time feedback to users while practicing. For example, the grip sensors may also include a feedback mechanism (e.g., tactile engine, light, or speaker) that notifies a user when he or she is gripping the club too tightly, which may negatively impact one's swing. This notification may occur at the exact moment that the pressure sensors sense the club is being gripped too tightly, for example, prior to swinging and/or during a golf swing. Alternatively, the feedback mechanism may be programmed to notify a user that the users grip was too tight after completion of a golf swing, either automatically, or in response to a user request for feedback and/or sensor data.

To provide the data to system 100, such pressure sensors may form an independent sensor device (e.g., a version of sensor device 110). For example, the grip sensor may independently transmit data over a wireless connection (e.g., a Bluetooth connection) to computing device 120. Similarly, an independent grip sensor device may participate in a sensor mesh network to send data through system 100. Alternatively, the grip sensor(s) may interface with sensor device 410A (e.g., as one or more external sensor(s) 344) to provide the grip pressure data to system 100. For example, the grip sensor may transmit data to processor 210 for handling via an external sensor interface in sensor 110.

Figure 4B:
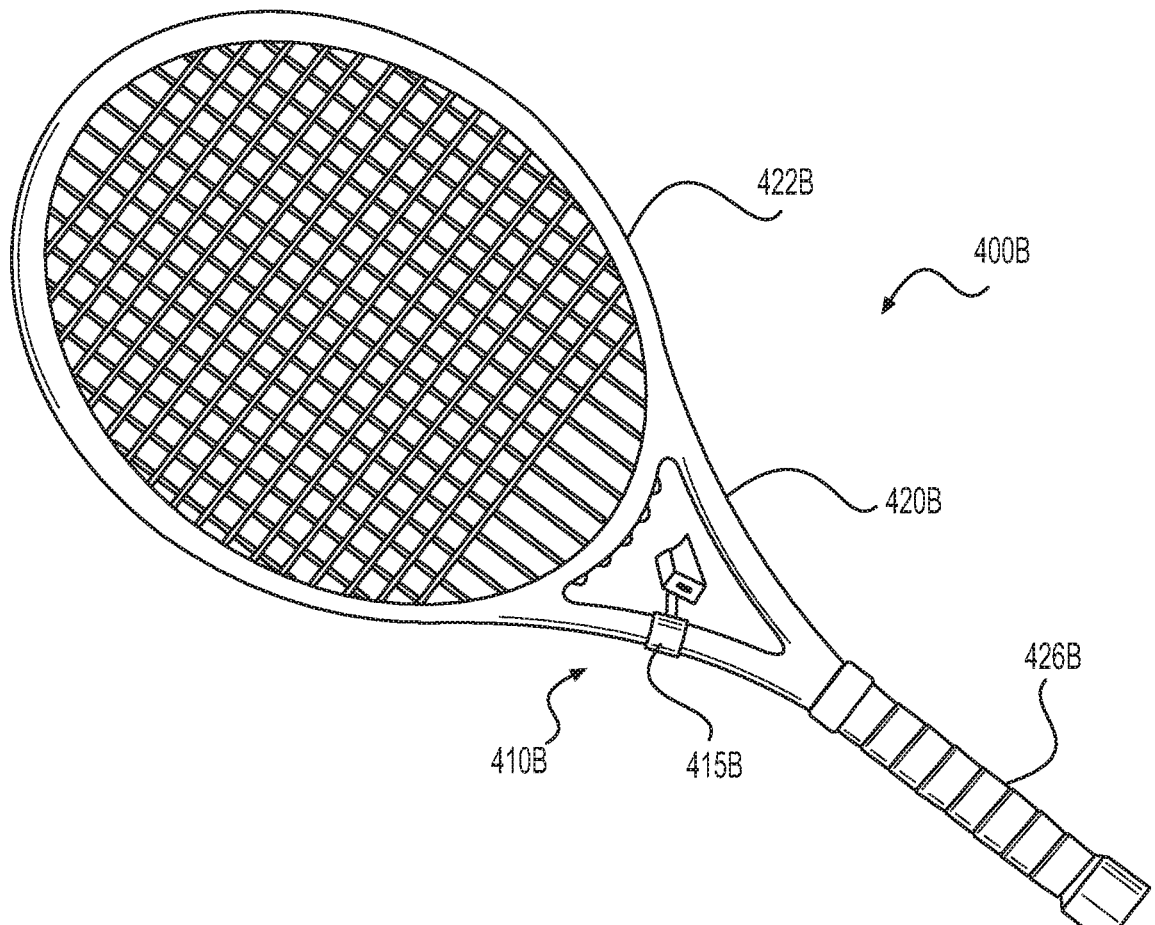

Turning to FIG. 4B, system 400B may include racket 420B with sensor device 410B. Racket 420B may be a conventional racket with head 422B and grip 426B.

Similar to system 400A, in system 400B, sensor device 410B (e.g., sensor device 110) may attach to racket 420B. In some embodiments, mount 415B may be used to secure sensor device 410B to racket 420B. As shown, sensor device 410B may connect to racket 420B between grip 426B and head 422B. This positioning of sensor device 410B may advantageously "hide" sensor device 410B from the line of sight of the user while he or she operates racket 420B. In still other embodiments, sensor device 410B may be mounted at a different position on racket 420B, such as at the top of head 422B, along the shaft, and/or on grip 426A.

Further, as explained above with regard to grip 426A of FIG. 4A, grip 426B may include one or more sensors to measure a user's grip. For example, one or more sensors may measure pressure on grip 426B from the user holding racket 420B, such as generating a pressure map of the user's grip. This may advantageously allow system 100 to determine how the user is holding racket 420B including, for example, determining the relative angle of the face of head 422B relative to the hand or hands of the user. This may allow system 100 to evaluate how the grip angle (e.g., angle with regard to the rotation of the axis of the grip) and pressure affects, for example, serve speed, placement, and spin.

Figure 4C:
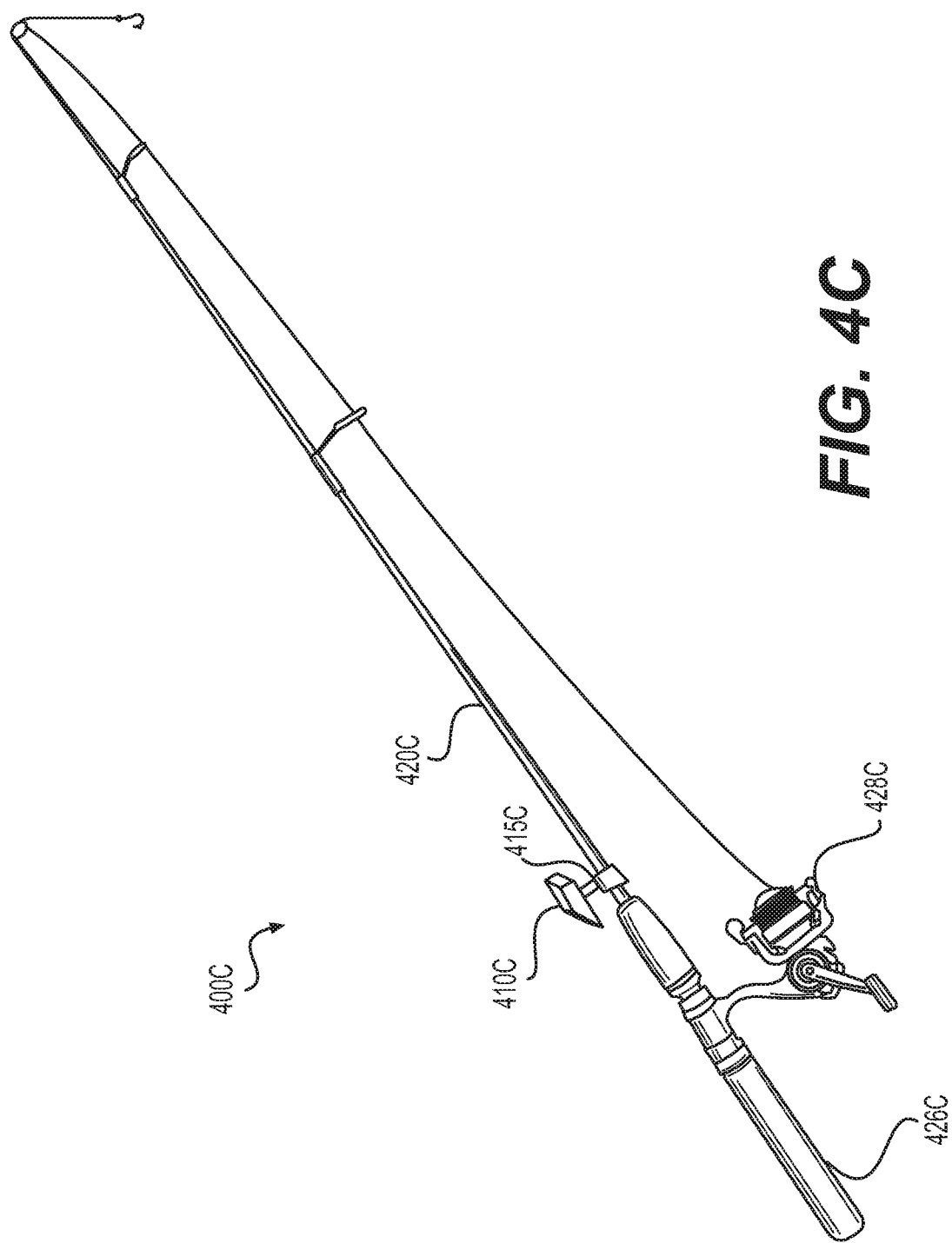

In FIG. 4C, system 400C may include fishing rod 420C and sensor device 410C. Fishing rod 420C may be a conventional fishing pole (e.g., for fly fishing or deep sea fishing. As shown, fishing rod may include reel 428C and handle 426C. Although not explicitly shown, fishing rod 420C may include additional lures and additional guides along the ferrule.

Similar to system 400A, in system 400C, sensor device 410C (e.g., sensor device 110) may attach to fishing rod 420C. In some embodiments, mount 415C may be used to secure sensor device 410C to fishing rod 420C. As shown, sensor device 410C may connect to fishing rod 420C where handle 426C meets the ferrule. This positioning of sensor device 410C may advantageously place sensor device 410B out of areas where an angler typically manipulates fishing rod 420C. For example, the depicted sensor device placement allows a user to freely operate reel 428C and does not interfere with the line. In still other embodiments, sensor device 410C may be mounted at a different position on fishing rod 420C, such as along the rod or ferrule, or integrated into reel 428C or handle 426C.

Further, as explained above with regard to grip 426A of FIG. 4A and grip 426B of FIG. 4B, handle 426C may include one or more sensors to measure a user's grip. For example, one or more sensors may measure pressure on handle 426C from the user holding handle 426C. This may advantageously allow system 100 to determine how stiffly the user is holding fishing rod 420C for evaluating how the grip and pressure affects casting technique.

Additionally, while not shown in FIG. 4C, fishing rod 420C may have additional sensors, either embedded or mounted) to measure action of reel 428C and/or tension in the fishing line. Further, sensor devices may be embedded in the hook or fly at the end of the fishing line. Based on this additional data system 100 may generate a data profile that correlates the casting motion (e.g, from MU data of sensor device 410C) with reel action, line tension, and fly movement. These combined timewise variables may be used to provide real-time feedback to a user to improve casting motions. For example, system 100 may activate a light or vibration to indicate to the user that the cast motion is too aggressive or oscillates too quickly. Additional combinations of sensors and resulting data may be used consistent with the disclosed embodiments to provide additional user feedback and analysis.

Figure 4D:
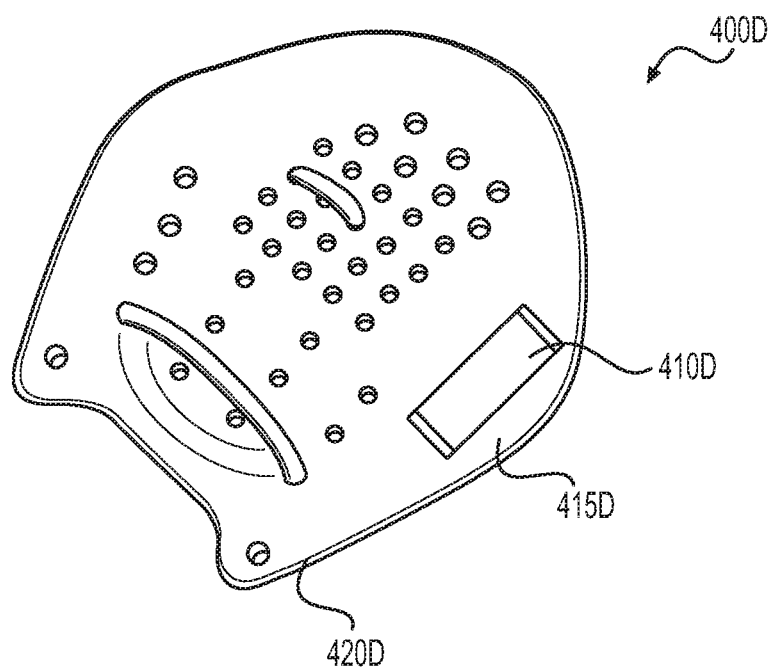

Turning to FIG. 4D, system 400D may include paddle 420D and sensor device 410D. As shown, paddle 420D may be swimming paddle with bands to mount to a swimmer's hand. However, paddle 420D may also be a paddle oar for boating, such as a canoe, stand-up paddleboard, or crew rowing.

In system 400D, sensor device 410D (e.g., sensor device 110) may attach to paddle 420D. In some embodiments, mount 415D may be used to secure sensor device 410D to paddle 420D. Alternatively, sensor device 410D may be integrated into paddle 420D.

Additionally, while not shown, additional sensor units may be used. For example, additional sensors may measure the pressure of water or the user's hand or against a face of paddle 420D. Such sensor data may be used to generate a pressure map of the face of paddle 420D. Based on the sensor data, system 100 may provide feedback on the orientation of paddle 420D during a stroke. For example, in the context of crew rowing, the paddle may be less efficient when its face is not held perpendicular to the direction of the row. The calculated pressure map may reveal points at which the water is not being effectively pulled (or pushed), and system 100 may provide user feedback to adjust the orientation to provide maximum pulling (or pushing) power in the water.

While not shown in FIGS. 4A through 4D, sensor device 110 may be attached to other equipment, such as apparel (e.g., belts, bracelets, shirts, shoes), walking assistance devices (e.g., canes, walkers, scooters, crutches), prosthetics (e.g., hand, arm, leg prosthetics), tools (e.g., hammer, spatula, scalpel), and/or fitness equipment (e.g., medicine balls, jump ropes, helmets, elastic bands).

Figure 5:
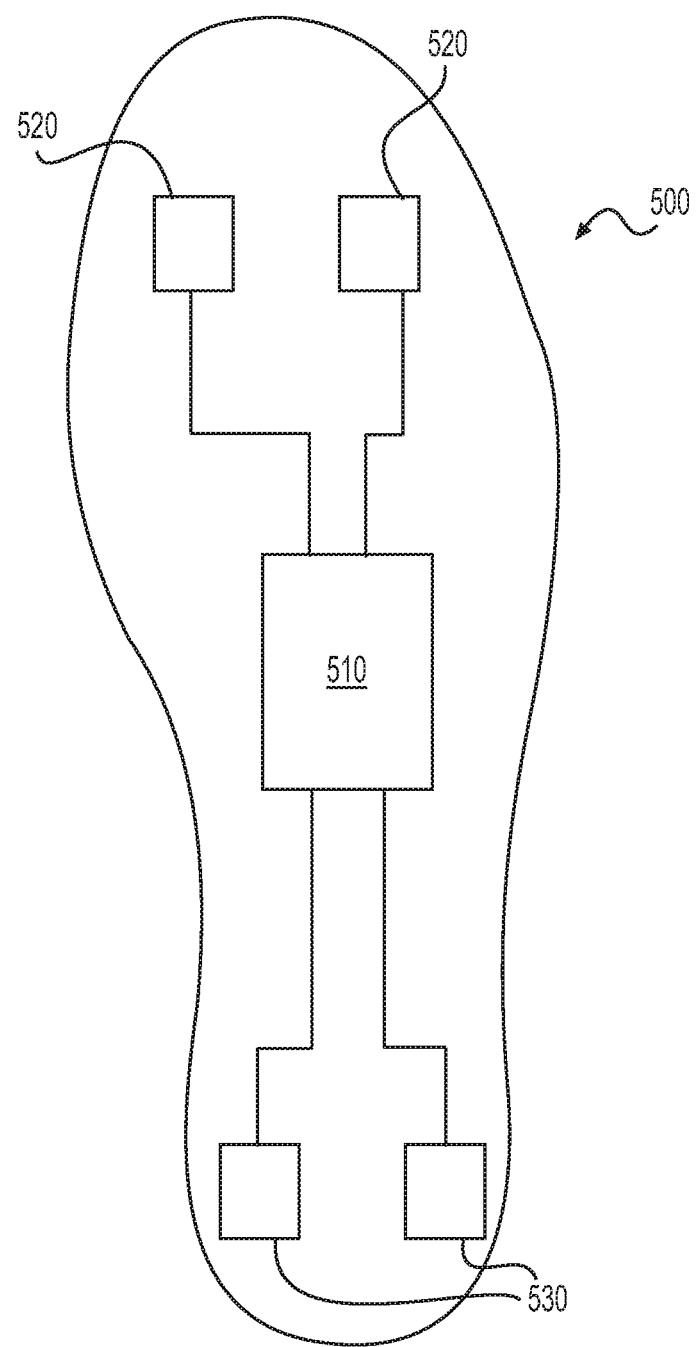
FIG. 5 is a block diagram for a footwear sensor device according to some embodiments of the present disclosure.

FIG. 5 is a block diagram for a footwear sensor device system 500 according to some embodiments of the present disclosure. As shown, sensor device 510 (e.g., sensor device 110) may be embedded into an insole or in a flat flexible sheet that fits below an insole in footwear.

In some embodiments, various pressure sensors may interface with sensor device 510. As shown, toe sensor devices 520 and heel sensor device 530 may connect to sensor device 510 (e.g., as external sensor(s) 344). As shown, four pressure sensors may be located at each corner of system 500 to determine pressure in two-dimensions. Based on the multi-dimensional pressure data, system 100 may generate a pressure map, and provide feedback to the user in real-time to improve stride, gait, pronation, and cadence. For example, various parts of output 320 may be used to indicate to the user that cadence should increase or to shorten stride length, while one is running or walking.

Figure 6:
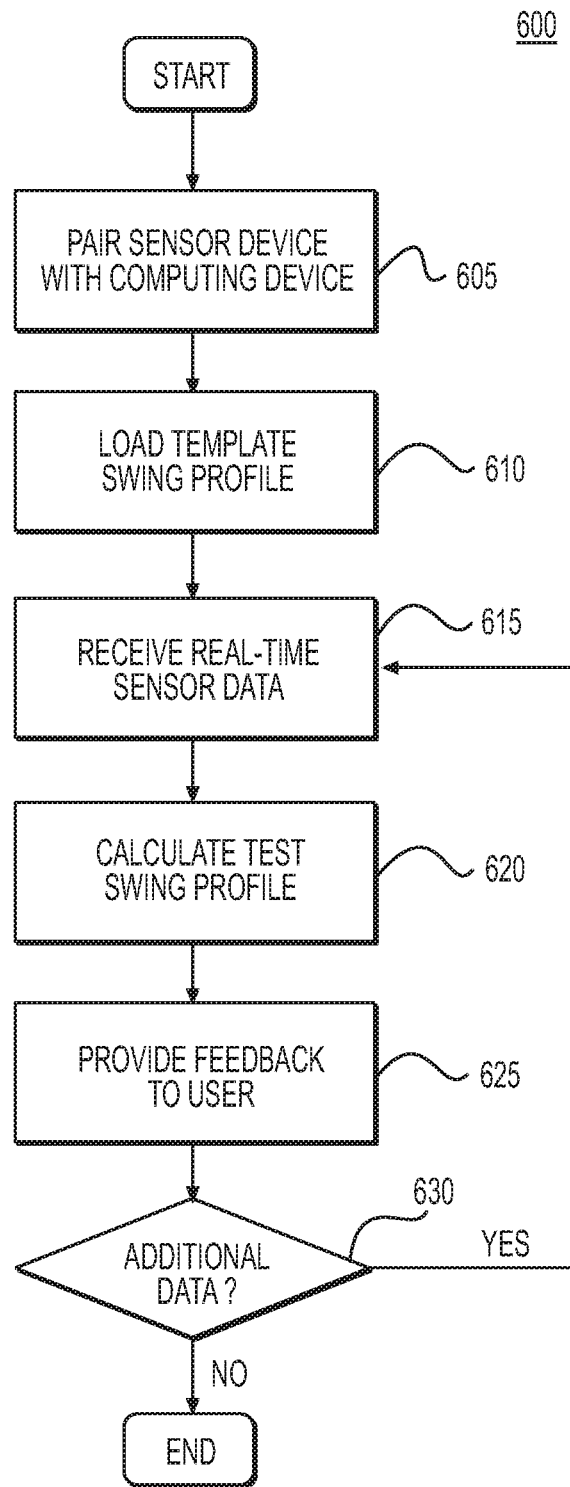
FIG. 6 is a flow diagram illustrating a real-time data acquisition and feedback process in accordance with some embodiments of the present disclosure.

FIG. 6 is a flow diagram illustrating a real-time data acquisition and feedback process in accordance with some embodiments of the present disclosure. Steps in the following discussion may be described with regard to the actions performed by computing device 120. However, one or more alternative devices may instead perform the disclosed functions. For example, in an embodiment, sensor device 110 may perform certain data aggregation, calculation, and/or feedback functions locally (e.g., step 610, step 615, step 620, step 625, and/or step 630). Additionally, while the steps of process 600 are shown in a particular order, the individual steps may be reordered or omitted.

Process 600 may be combined with step 605, where system 100 pairs one or more instances of sensor device 110 with computing device 120. In some embodiments, sensor device 110 may initiate a connection to computing device 120 based on input from a user (e.g., using input 330, such as pressing a button). For example, sensor device 110 may utilize a Bluetooth pairing procedure or connect to computing device 120 via a Wi-Fi connection. In some embodiments, computing device may search or look for sensor devices that are trying to connect or available for connection.

In some embodiments, step 610 may include a calibration procedure. Sensor device 110 may calibrate sensors, such as IMU 230, prior to pairing with computing device 120. For example, sensor device 110 may provide an indication to a user (e.g., a flashing light of lights 322) to indicate to a user to rotate sensor device 110 so that IMU 230 may align its axes and adjust scaling factors to increase accuracy in position and orientation calculations. In other embodiments, calibration may occur during or after pairing, such as when system 100 determines that the data from IMU 230 lacks necessary precision.

In step 610, process 600 may load a template swing profile. The term "swing profile" as used in this disclosure may refer to various golf motions, including swinging a driver, performing a chip shot, and/or putting with a putter, for example. The terms "putt profile" and "swing profile" may be used interchangeably. Computing device 120 may retrieve a data profile (e.g., a motion profile) to serve as a template or pattern for comparing purposes. The data profile may include multi-dimensional acceleration and/or orientation data corresponding to a golf swing. In an embodiment, the template swing profile may be recalled from local or network storage. For example, computing device 120 may request a particular template swing profile from server 130 or other cloud storage.

In an embodiment, loading a template swing profile (step 610) may include recording one or more motion profiles for an actual swing. For example, a user may provide an initial motion at the start of a practice session that acts as a template and may want to practice repeating that initial, template motion. To record an initial template motion, system 100 may receive sensor data from sensor device 200 that is recorded during the swing motion. For example, IMU 230 may record acceleration and/or orientation data along three or fewer axes during a particular swing motion. Sensor device 110 may transmit the IMU data to computing device 120, which may, in turn, store the IMU data for the swing motion as a motion profile. For example, the "ideal" template swing may be recorded in a clinical setting, such as with a trainer, and later recalled when a user practices without the trainer nearby.

In an embodiment, step 610 may include recording a motion, generating the template, storing the template in a networked server (e.g., server 130), and/or requesting the stored template for networked storage. In still further embodiments, step 610 may include receiving a motion profile that is generated from a software application, rather than recorded from a live motion. For example, in step 610, computing device 120 may receive a motion profile generated by process 1100, which is described later in this specification and depicted in FIG. 11. Additional combinations or intermittent processes may be used such that computing device 120 receives a data profile or a motion profile for use consistent with the remaining steps of process 600.

In step 615, process 600 may receive real-time sensor data. Computing device 120 may receive real-time data from sensor device 110. In some embodiments, computing device 120 may receive sensor data in real-time over a wireless transmission technology such as Bluetooth or Wi-Fi (e.g., using Bluetooth transceiver 352 and/or Wi-Fi transceiver 354). Computing device 120 may receive packets of data containing real-time data samples from one or more of internal sensor(s) 341 and/or external sensor(s) 344. For example, computing device 120 may receive one or more packets containing 1-10 samples of data for a given sensor over an interval of 1-5 milliseconds, with less than a 5 millisecond delay from capture by sensor device 110. The samples may be stored as time-value pairs in an array, such as sensor sample values paired with timestamp values in a list. In some embodiments, computing device 120 may continue to receive sensor data packets so long as sensor device 110 captures relevant data (e.g., as discussed with regard to step 810, step 820, and/or step 830 of FIG. 8 below).

In step 620, process 600 may calculate a test swing profile. Computing device 120 may aggregate received sensor data into a combined time-wise arrangement of sensor readings. In some embodiments, computing device 120 may create a new data structure organizing the sensor data for a given motion. The data structure may store an abbreviated form of raw sensor data with standardized metadata in a data object. For example, computing device 120 may receive raw sensor data having varying fidelity (e.g., differing sample rates and/or data precision). Computing device 120 may organize data such that the resulting class of data structures has consistent sampling rates and/or sample data with consistent resolution (e.g., values having the same number of significant figures). For example, computing device 120 may down-sample sensor data having a sampling rate greater than the standardized sampling rate or range of sampling rates for a given class or type of swing profile (e.g., a type of motion profile) data structures. For received sensor data having a sampling rate that is lower than a minimum sampling rate for a given class of swing profiles, computing device 120 may interpolate additional data points to achieve the desired sampling rate (e.g., using curve fitting or regression analysis).

In some embodiments, the swing profile (e.g., a data profile or motion profile) may include standardized metadata. For example, the swing profile class may include fields for standardized data analysis variables, such as mean and median values of the sensor data, as well as standard deviation, high value, low value, local minima and maxima, and points of inflection. Additional data analytics discussed throughout this disclosure may be stored as part of the swing profile.

In some embodiments, the calculations may include comparing the test swing profile to a reference profile, such as the template swing profile (e.g., from step 610). Computing device 120 may compare the two profiles to determine where the two profiles deviate and how much the two profiles deviate. In an embodiment, computing device 120 may generate a profile indicating the differences over time. Additional comparisons may be made consistent with the data profile and motion profile comparisons discussed in this disclosure.

In step 625, process 600 may provide feedback based on the calculations made in step 620. Feedback may include visual, tactile, and/or auditory signals directed to a user and/or third party. The feedback may be based on the calculated test swing profile, its associated metadata, or a comparison based on the same. The calculations from step 620 may act as triggers for feedback. For example, when a test swing profile deviates more than a predefined amount, system 100 may generate feedback. In another example, system 100 may generate feedback when the test motion profile matches certain criteria, such as an average or standard deviation value. Such values may be user-defined or pre-defined (e.g., from loading a template profile in step 610). Feedback may be provided to a user between 5 and 20 milliseconds from receiving the data from the sensors, for example.

In some embodiments, computing device 120 may provide feedback to a user. For example, computing device may generate a graphical user interface that displays an analysis of sensor data. The graphical user interface may depict different views of the swing motion, such as those depicted in user interface 700A and user interface 700B in FIGS. 7A and 7B.

Figure 7C:
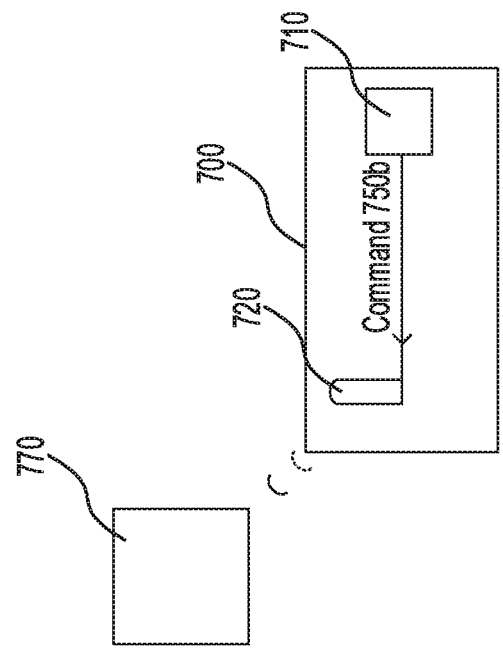
FIG. 7C illustrates an example of variable transmission rates in response to signal strength in accordance with some embodiments of the present disclosure.
Figure 7C:
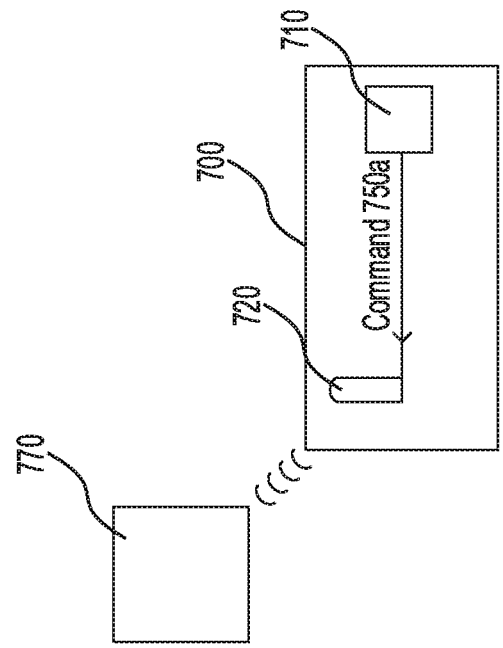

FIGS. 7A-7C illustrate examples of variable transmission rates in response to environmental variables according to some embodiments of the present disclosure. As depicted in FIG. 7A, wearable apparatus 700 includes a processor 710 and a transmitter 720. For example, wearable apparatus 700 may comprise a sensor attached to a wrist, a knee, or other body part, as described above with respect to FIG. 1. Additionally or alternatively, wearable apparatus 700 may comprise a sensor attached to a tennis racket, golf club, or other sporting equipment, as described above with respect to FIGS. 4A-4D. In some embodiments, wearable apparatus 700 may comprise sensor device 200 of FIG. 2, and thus processor 710 may comprise processor 210, and transmitter 720 may comprise wireless transceiver 250.

In some embodiments, wearable apparatus 700 may include a battery 740 or other source of portable power (e.g., a portable fuel cell or the like). As depicted in FIG. 7A, processor 710 may send a command 750*a* to transmitter 720 when a charge of battery 740 is above a threshold and a command 750*b* to transmitter 720 when the charge is below the threshold. For example, command 750*a* may comprise a command to transmitter 720 to operate in a high-power mode. Similarly, command 750*b* may comprise a command to transmitter 720 to operate in a low-power mode.

A low-power mode may comprise a mode having a lower range of communication than a high-power mode. For example, a low-power mode may comprise a mode in which transmitter 720 communicates using Bluetooth® while a high-power mode may comprise a mode in which transmitter 720 communicates using Wi-Fi. In another example, a low-power mode may comprise a mode in which transmitter 720 communicates using Wi-Fi while a high-power mode may comprise a mode in which transmitter 720 communicates using long-term evolution (LTE).

Additionally or alternatively, a low-power mode may comprise a mode having a lower transmission rate than a high-power mode. For example, a low-power mode may comprise a mode in which transmitter 720 sends data every hour while a high-power mode may comprise a mode in which transmitter 720 sends data every 15 minutes. In another example, a low-power mode may comprise a mode in which transmitter 720 sends data no more than once per day while a high-power mode may comprise a mode in which transmitter 720 sends data no more than once per hour.

Additionally or alternatively, a low-power mode may comprise a mode in which transmitter 720 only receives data while a high-power mode may comprise a mode in which transmitter 720 both sends and receives data.

Additionally or alternatively, a low-power mode may comprise any other mode in which transmitter 720 uses less power than that used in a high-power mode. For example, a low-power mode may comprise a mode in which transmitter 720 communicates using a lower frequency than that used in a high-power mode. Similarly, a low-power mode may comprise a mode in which transmitter 720 communicates using a longer wavelength than that used in a high-power mode.

FIG. 7B depicts another example using wearable apparatus 700. In the example of FIG. 7B, wearable apparatus 700 may include a non-transitory storage medium 760, such as a flash memory, a portable hard disk, a random-access memory (RAM), or the like. As depicted in FIG. 7B, processor 710 may send a command 750*a* to transmitter 720 when available space on medium 760 is below a threshold and a command 750*b* to transmitter 720 when the available space is above the threshold.

Similarly, FIG. 7C depicts yet another example using wearable apparatus 700. In the example of FIG. 7C, wearable apparatus 700 may communicate with external device 770. In some embodiments, external device 770 may comprise computing device 120 of FIG. 1. As depicted in FIG. 7C, processor 710 may send a command 750*a* to transmitter 720 when a strength of signal with external device 770 is above a threshold and a command 750*b* to transmitter 720 when the strength of signal is below the threshold. The signal of strength may be based on a speed of data transfer (e.g., a faster transfer indicating a stronger signal, and a slower transfer indicating a weaker signal) and/or based on packet losses (e.g., greater packet losses indicating a weaker signal, and fewer packet losses indicating a stronger signal).

The determinations of FIGS. 7A-7C are exemplary only and not exhaustive of environmental factors that processor 710 may use in selecting a power mode for transmitter 720. For example, additionally or alternatively, processor 710 may receive, from at least one sensor (e.g., sensor(s) 240 of FIG. 2) of wearable apparatus 700 one or more measurements of at least one property (e.g., accelerations from an accelerometer or the like) that are indicative of an activity level of a user of wearable apparatus 700. Processor 710 may thus send a command 750*a* to transmitter 720 when the activity level is above a threshold and a command 750*b* to transmitter 720 when the activity level below the threshold. Additionally or alternatively, one or more user settings preclude processor 710 from sending command 750*a* and/or command 750*b* during particular dates, times, or the like. For example, processor 710 may be configured to send command 750*b* during periods of expected inactivity (such as evenings, between 10 pm and 5 am, or the like). Similarly, processor 710 may be configured to send command 750*a* during periods of expected activity (such as mornings, between 3 pm and 7 pm, or the like). In another example, processor 710 may be configured to send command 750*a* (e.g., to perform a batch transfer) during periods in which a stronger signal is expected. For example, processor 710 may retrieve a stored setting or determine, using stored historical data, that a strong Wi-Fi (or other) signal is generally available between 10 pm and 4 am. Accordingly, processor 710 may be configured to send command 750*a* in order to perform a batch transfer of stored data at such times.

Although depicted using only two power modes, any number of power modes may be used. For example, processor 710 may select between a low-power mode, a standard mode, and a high-power mode. In one example, a low-power mode may comprise a mode in which transmitter 720 communicates using Bluetooth®, a standard mode may comprise a mode in which transmitter 720 communicates using Wi-Fi, and a high-power mode may comprise a mode in which transmitter 720 communicates using LTE. In an additional or alternative example, a low-power mode may comprise a mode in which transmitter 720 sends data no more than once per day, a standard mode may comprise a mode in which transmitter 720 sends data no more than once per hour, and a high-power mode may comprise a mode in which transmitter 720 sends data no more than once every 15 minutes. In an additional or alternative example, a low-power mode may comprise a mode in which transmitter 720 communicates using a frequency of 2402 MHz, a standard mode may comprise a mode in which transmitter 720 communicates using a frequency of 2441 MHz, and a high-power mode may comprise a mode in which transmitter 720 communicates using a frequency of 2480 MHz. One of ordinary skill will recognize that more than three power modes may be used in any of the embodiments described herein.

Moreover, although depicted using a single threshold, any number of thresholds may be used. For example, processor 710 may send command 750a to transition transmitter 720 from a low-power mode to a high-power mode when the battery charge, used storage capacity, and/or signal strength exceeds a first threshold but may send command 750b to transition transmitter 720 from a high-power mode to a low-power mode only when the battery charge, used storage capacity, and/or signal strength is below a second, lower threshold. In another example, processor 710 may send command 750a to transition transmitter 720 to a high-power mode when the battery charge, used storage capacity, and/or signal strength exceeds a first threshold, may send a command to transition transmitter 720 to a standard mode when the battery charge, used storage capacity, and/or signal strength is below the first threshold but above a second, lower threshold, and may send command 750b to transition transmitter 720 to a low-power mode when the battery charge, used storage capacity, and/or signal strength is below the second threshold.

Additionally or alternatively, one or more thresholds applied to battery charge, used storage capacity, and/or signal strength may be dynamically changed in response to the battery charge, used storage capacity, and/or signal strength. For example, processor 710 may send command 750a to transmitter 720 when the used storage capacity and/or signal strength exceeds a first threshold with the first threshold being lower when the battery charge is above a second threshold and higher when the battery charge is below the second threshold. In another example, processor 710 may send command 750a to transmitter 720 when the battery charge and/or used storage capacity exceeds a first threshold, and processor 710 may adjust the first threshold upwards when the signal strength falls below a second threshold but may adjust the first threshold downwards only when the signal strength rises above a third threshold greater than the second threshold. In yet another example, processor 710 may send command 750a to transmitter 720 when the used storage capacity and/or signal strength exceeds a first threshold, may send a command to transmitter 720 to operate in a standard mode when the used storage capacity and/or signal strength is below the first threshold but above a second, lower threshold, and may send command 750b to transmitter 720 when the used storage capacity and/or signal strength is below the second threshold, with the first threshold and/or the second threshold being lower when the battery charge is above a third threshold and higher when the battery charge is below the third threshold.

Although depicted separately, any of the determinations depicted in FIGS. 7A-7C may be combined. For example, as explained above, thresholds applied to one environmental variable may dynamically change in response to another environmental variable. Additionally or alternatively, processor 710 may send command 750a only when battery charge exceeds a charge threshold and signal strength exceeds a signal threshold, may send command 750b only when battery charge is below a charge threshold and available storage capacity is below a storage threshold, or the like.

Figure 8:
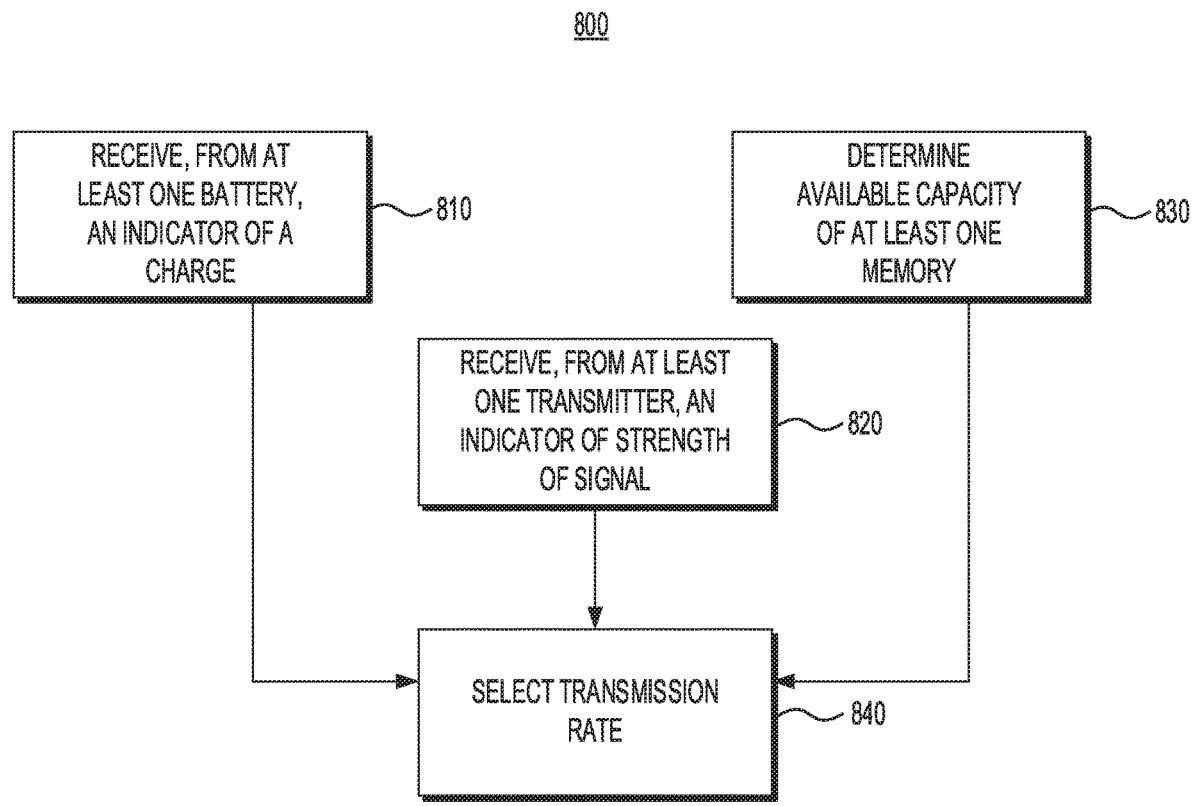
FIG. 8 is a flow diagram illustrating a process for selecting a transmission rate in response to environmental variables in accordance with some embodiments of the present disclosure.

FIG. 8 is a flow diagram illustrating a process for selecting a transmission rate in response to environmental variables in accordance with some embodiments of the present disclosure. Steps in the following discussion may be described with regard to the actions performed locally by sensor device 110. However, one or more alternative devices may instead perform the disclosed functions. For example, in an embodiment, computing device 120 may perform certain processing of environmental variables and/or selection of transmission rates locally (e.g., step 840). Additionally, while the steps of process 800 are shown in a particular order, the individual steps may be reordered or omitted.

In step 810, process 800 may receive, from at least one battery of sensor device 110, an indicator of a charge. For example, the at least one battery may include a voltmeter, an ammeter, or other device configured to measure a variable indicative of how much charge the at least one battery holds; how much power, voltage, current, and/or the like that at least one battery may produce over time; or the like. Accordingly, process 800 may include receiving signals from the voltmeter, the ammeter, or the like. In some embodiments, step 810 may further include processing signals from the voltmeter, the ammeter, or the like to determine the indicator of charge. For example, the processing may include extrapolation, over time, based on signals from the voltmeter, the ammeter, or the like and/or from historical data related to the at least one battery to determine an expected amount of time for which the at least one battery may charge the at least one battery.

In step 820, process 800 may receive, from at least one transmitter of sensor device 110, an indicator of a strength of signal from a remote device (e.g., computing device 120). For example, the at least one transmitter may comprise a wireless transceiver, an antenna, or any other device configured to communicate over a wireless connection with the remote device. Accordingly, process 800 may include receiving results of a connection test between the at least one transmitter and the remote device. In some embodiments, step 820 may further include processing signals from the at least one transmitter. For example, the processing may include extrapolation based on signals indicative of a speed of connection, a proportion of lost packets to transmitted packets, or the like from the at least one transmitter to determine a measure of connection strength.

In step 830, process 800 may determine an available capacity of at least one memory of sensor device 110. For example, step 830 may include determining the available capacity from a file allocation table of a FAT formatted memory, a master file table (MFT) of an NTFS formatted memory, a catalog file of an HFS formatted memory, or the like.

In step 840, process 800 may send a command to the at least one transmitter to operate in a low-power mode or a high-power mode. For example, the low-power mode may have at least one of a lower range of communication or a lower transmission rate than the high-power mode. As described above, additional power modes may be used rather than two.

In the example of FIG. 8, the command may be based on the indicator of charge from the at least one battery, the available capacity of the at least one memory, and the indicator of strength of signal from the at least one transmitter. In some embodiments, the command may be based on a sequential application of the indicators. For example, step 840 may include selecting between a low-power mode and a medium-power mode based on the indicator of charge from the at least one battery when the available capacity of the at least one memory is above a threshold and selecting between a medium-power mode and a high-power mode based on the indicator of charge from the at least one battery when the available capacity of the at least one memory is below the threshold. In another example, step 840 may include selecting between a low-power mode and a medium-power mode based on the available capacity of the at least one memory when the indicator of strength of signal from the at least one transmitter is below a threshold and selecting between a medium-power mode and a high-power mode based on the available capacity of the at least one memory when the indicator of strength of signal from the at least one transmitter is above the threshold.

In other embodiments, the command may be based on a threshold applied to one indicator as adjusted by the other indicators. For example, step 840 may include selecting between a low-power mode and a high-power mode based on the indicator of charge from the at least one battery as compared with a threshold that is lower when the available capacity of the at least one memory is lower and/or when the indicator of strength of signal from the at least one transmitter is higher. In another example, step 840 may include selecting between a low-power mode and a high-power mode based on the available capacity of the at least one memory as compared with a threshold that is lower when the indicator of charge from the at least one battery is lower and/or when the indicator of strength of signal from the at least one transmitter is lower. In yet another example, step 840 may include selecting between a low-power mode and a high-power mode based on the indicator of strength of signal from the at least one transmitter as compared with a threshold that is lower when the available capacity of the at least one memory is lower and/or when the indicator of charge from the at least one battery is higher.

In other embodiments, the command may be based a multi-factor analysis of the indicator of charge from the at least one battery, the available capacity of the at least one memory, and/or the indicator of strength of signal from the at least one transmitter. For example, a scoring algorithm (such as a weighted average or the like) applied to the indicator of charge from the at least one battery, the available capacity of the at least one memory, and/or the indicator of strength of signal from the at least one transmitter may produce a score that is applied to one or more thresholds to select between power modes.

Although depicted using the indicator of charge from the at least one battery, the available capacity of the at least one memory, and the indicator of strength of signal from the at least one transmitter, process 800 may use fewer indicators. Additionally or alternatively, process 800 may use additional indicators, such as an indicator of an activity level, one or more environmental factors, or the like. as explained above.

Figure 9C:
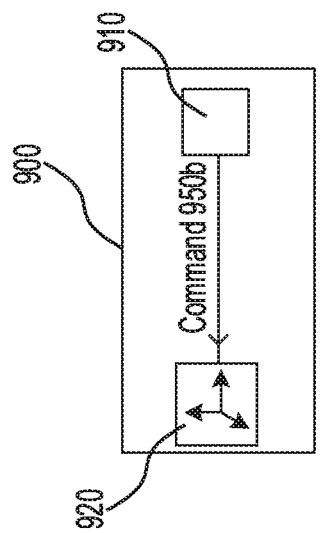
FIG. 9C illustrates an example of variable sampling rates in response to activity level in accordance with some embodiments of the present disclosure.
Figure 9C:
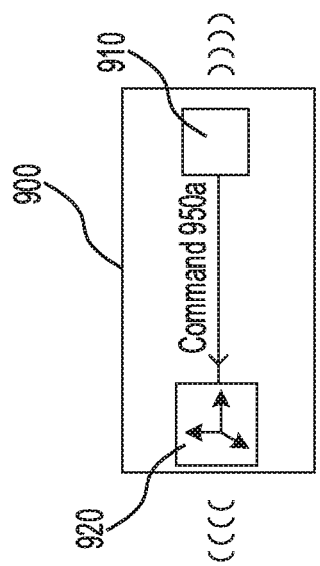

FIG. 9A-9C illustrate examples of variable sampling rates in response to environmental variables according to some embodiments of the present disclosure. As depicted in FIG. 9A, wearable apparatus 900 includes a processor 910 and a sensor 920. For example, wearable apparatus 900 may comprise a sensor attached to a wrist, a knee, or other body part, as described above with respect to FIG. 1. Additionally or alternatively, wearable apparatus 900 may comprise a sensor attached to a tennis racket, golf club, or other sporting equipment, as described above with respect to FIGS. 4A-4D. In some embodiments, wearable apparatus 900 may comprise sensor device 200 of FIG. 2, and thus processor 910 may comprise processor 210, and sensor 920 may comprise sensor(s) 240.

In some embodiments, wearable apparatus 900 may include a battery 940 or other source of portable power (e.g., a portable fuel cell or the like). As depicted in FIG. 9A, processor 910 may send a command 950*a* to sensor 920 when a charge of battery 940 is above a threshold and a command 950*b* to sensor 920 when the charge is below the threshold. For example, command 950*a* may comprise a command to sensor 920 to operate in a high-power mode. Similarly, command 950*b* may comprise a command to sensor 920 to operate in a low-power mode.

Additionally or alternatively, a low-power mode may comprise a mode having a lower sampling rate than a high-power mode. For example, a low-power mode may comprise a mode in which sensor 920 processes measurements every centisecond while a high-power mode may comprise a mode in which sensor 920 processes measurements every millisecond. In another example, a low-power mode may comprise a mode in which sensor 920 processes measurements no more than once per millisecond while a high-power mode may comprise a mode in which sensor 920 processes measurements no more than once per microsecond.

Additionally or alternatively, a low-power mode may comprise any other mode in which sensor 920 uses less power than that used in a high-power mode. For example, a low-power mode may comprise a mode in which sensor 920 processes measurements with lower accuracy than that in a high-power mode.

FIG. 9B depicts another example using wearable apparatus 900. In the example of FIG. 9B, wearable apparatus 900 may include a non-transitory storage medium 960, such as a flash memory, a portable hard disk, a random-access memory (RAM), or the like. As depicted in FIG. 9B, processor 910 may send a command 950*a* to sensor 920 when available space on medium 960 is below a threshold and a command 950*b* to sensor 920 when the available space is above the threshold.

Similarly, FIG. 9C depicts yet another example using wearable apparatus 900. As depicted in FIG. 9C, processor 910 may send a command 950*a* to sensor 920 when measurements from sensor 920 are indicative of activity level (e.g., movement of wearable apparatus 900) above a threshold and a command 950*b* to sensor 920 when the activity level is below the threshold. The activity may be based on magnitude of the measurements (e.g., higher acceleration indicating higher activity level) and/or based on rate of change of the measurements (e.g., higher rates of change of location indicating higher activity level).

The determinations of FIGS. 9A-9C are exemplary only and not exhaustive of environmental factors that processor 910 may use in selecting a power mode for sensor 920. For example, additionally or alternatively, processor 910 may receive, from at least one transmitter (e.g., wireless transceiver 250 of FIG. 2) of wearable apparatus 900 an indicator of a strength of signal from a remote device (e.g., computing device 120 of FIG. 1). Processor 910 may thus send a command 950*a* to sensor 920 when the signal strength is above a threshold and a command 950*b* to sensor 920 when the signal strength is below the threshold. Additionally or alternatively, one or more user settings preclude processor 910 from sending command 950*a* and/or command 950*b* during particular dates, times, or the like. For example, processor 910 may be configured to send command 950*b* during periods of expected inactivity (such as evenings, between 10 pm and 5 am, or the like). Similarly, processor 910 may be configured to send command 950*a* during periods of expected activity (such as mornings, between 3 pm and 7 pm, or the like). In another example, processor 710 may be configured to send command 950*b* (e.g., to slow data collection) during periods in which a weaker signal is expected. For example, processor 910 may retrieve a stored setting or determine, using stored historical data, that a strong Bluetooth® (or other) signal is generally unavailable between 7 am and 9 am (e.g., due to commuting). Accordingly, processor 910 may be configured to send command 950b in order to slow data collection at such times.

Although depicted using only two power modes, any number of power modes may be used. For example, processor 910 may select between a low-power mode, a standard mode, and a high-power mode. In one example, a low-power mode may comprise a mode in which sensor 920 processes measurements no more than once per centisecond, a standard mode may comprise a mode in which sensor 920 processes measurements no more than once per millisecond, and a high-power mode may comprise a mode in which sensor 920 processes measurements no more than once per microsecond. One of ordinary skill will recognize that more than three power modes may be used in any of the embodiments described herein.

Moreover, although depicted using a single threshold, any number of thresholds may be used. For example, processor 910 may send command 950a to transition sensor 920 from a low-power mode to a high-power mode when the battery charge, used storage capacity, and/or activity level exceeds a first threshold but may send command 950b to transition sensor 920 from a high-power ode to a low-power mode only when the battery charge, used storage capacity, and/or activity level is below a second, lower threshold. In another example, processor 910 may send command 950a to transition sensor 920 to a high-power mode when the battery charge, used storage capacity, and/or activity level exceeds a first threshold, may send a command to transition sensor 920 to a standard mode when the battery charge, used storage capacity, and/or activity level is below the first threshold but above a second, lower threshold, and may send command 950b to transition sensor 920 to a low-power mode when the battery charge, used storage capacity, and/or activity level is below the second threshold.

Additionally or alternatively, one or more thresholds applied to battery charge, used storage capacity, and/or activity level may be dynamically changed in response to the battery charge, used storage capacity, and/or activity level. For example, processor 910 may send command 950a to sensor 920 when the used storage capacity and/or activity level exceeds a first threshold with the first threshold being lower when the battery charge is above a second threshold and higher when the battery charge is below the second threshold. In another example, processor 910 may send command 950a to sensor 920 when the battery charge and/or used storage capacity exceeds a first threshold, and processor 910 may adjust the first threshold upwards when the activity level falls below a second threshold but may adjust the first threshold downwards only when the activity level rises above a third threshold greater than the second threshold. In yet another example, processor 910 may send command 950a to sensor 920 when the used storage capacity and/or activity level exceeds a first threshold, may send a command to sensor 920 to operate in a standard mode when the used storage capacity and/or activity level is below the first threshold but above a second, lower threshold, and may send command 950b to sensor 920 when the used storage capacity and/or activity level is below the second threshold, with the first threshold and/or the second threshold being lower when the battery charge is above a third threshold and higher when the battery charge is below the third threshold.

Although depicted separately, any of the determinations depicted in FIGS. 9A-9C may be combined. For example, as explained above, thresholds applied to one environmental variable may dynamically change in response to another environmental variable. Additionally or alternatively, processor 910 may send command 950a only when battery charge exceeds a charge threshold and activity level exceeds an activity threshold, may send command 950b only when battery charge is below a charge threshold and available storage capacity is below a storage threshold, or the like.

Moreover, although depicted as controlling a single sensor with a single command, processor 910 may send one or more commands to control a plurality of sensors differently. For example, in response to a low indicator of activity, processor 910 may leave one sensor enabled but may disable one or more other sensors or may leave one sensor in a high-power mode and place the other sensor(s) in a low-power mode. Additionally or alternatively, processor 910 may send one or more commands to control portions of sensors differently than other portions. For example, sensor 920 comprises a plurality of inertial measurement units (IMUs), processor 910 may control the following portions of each IMU separately as follows in Example Table 1, which is not exclusive:

TABLE 1

(exemplary only)

| | Characteristics | Example Activities |
|---|---|---|
| Magnetometer | Translational measurements but jitter reduces accuracy | Walking, running, or the like |
| Gyroscope | Accurate angular momentum measurements but drift needs correction | Limb-based movement, such as arm movement or the like |
| Accelerometer (in some examples, a gravitometer) | Suffers from ringdown and noise but can correct for jitter and/or drift and increase resolution | Walking, running, or the like |

Accordingly, in one example, in response to an indicator of stationary activity (such as yoga, SoulCycle®, or the like), processor 910 may leave one or more gyroscopes of the one or more sensors enabled but may disable and/or place into a low-power mode one or more magnetometers, accelerometers, gravitometers, or the like of the sensor(s). In another example, in response to an indicator of walking, processor 910 may activate one or more magnetometers, accelerometers, gravitometers, or the like of the one or more sensors but leave them in a low-power mode while maintaining one or more gyroscopes of the sensor(s) in a high-power mode.

Accordingly, processor 910 may adjust sampling rates of different sensors or even of different portions of the same sensor differently. For example, processor 910 may reduce all portions of the sensor(s) to 100 Hz when a user is detected as walking and then increase only one or more gyroscopes of the sensor(s) to 250 Hz if the user begins running rather than walking.

Additionally or alternatively, the determinations of FIGS. 9A-9C may be used for post-processing in addition to or in lieu of adjusting sampling rates of the sensor(s). For example, processor 910 may downsample a series of values from one or more portions of one or more sensors in response to the indicator of charge from the at least one battery, the available capacity of the at least one memory, the indicator of activity level from the one or more sensors, an indicator of a strength of signal with a remote device (e.g., computing device 120), one or more environmental factors, or any combination thereof. The downsampling may be performed immediately after the values are received, prior to storage or transmission of the values, or on the remote device (e.g., computing device 120) after receipt thereof. For example, if the one or more sensors are sampling at 250 Hz, and processor 910 determines that the user was walking during the sampling, processor 910 may downsample the values received from the one or more sensors (e.g., to 100 Hz) as they are received, before storing in the at least one memory, before transmitting the same, or may instruct remote device (e.g., computing device 120) to downsample the transmitted values. Alternatively, the remove device (e.g., computing device 120) may downsample in response to its own determination that the user was walking during the sampling.

Figure 10:
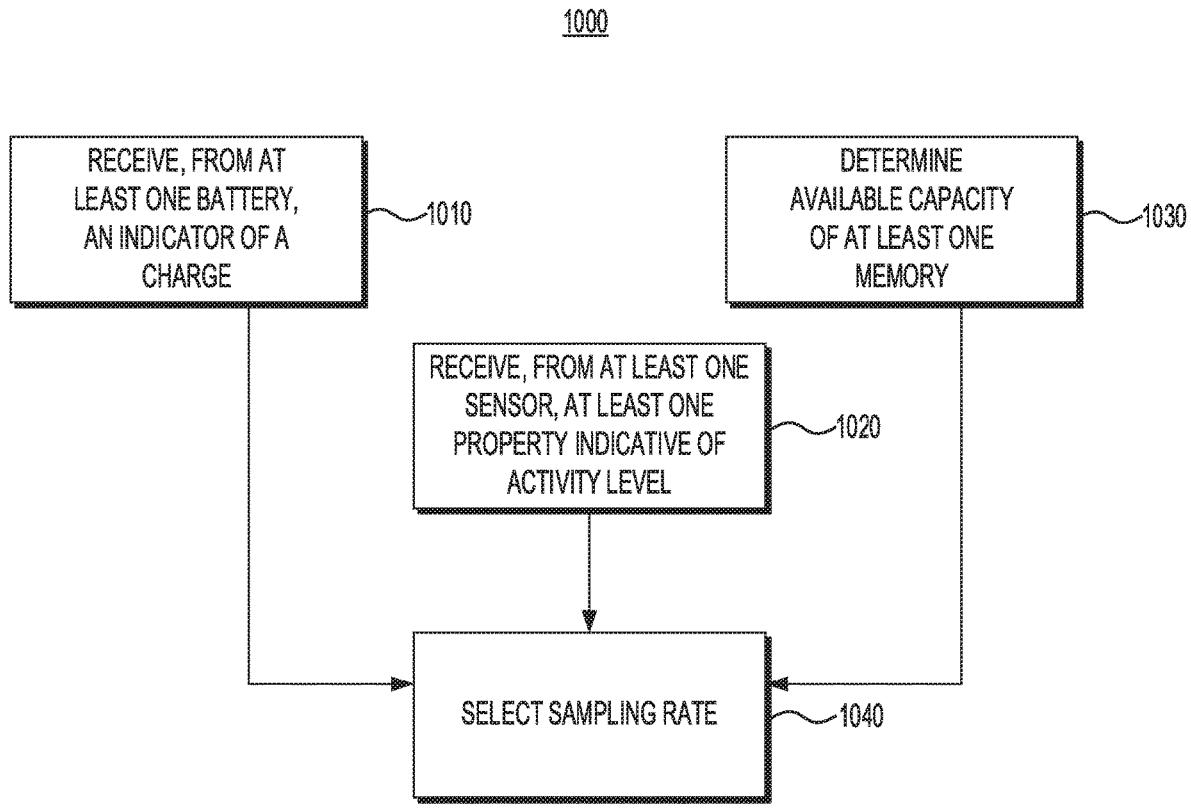
FIG. 10 is a flow diagram illustrating a process for selecting a sampling rate in response to environmental variables in accordance with some embodiments of the present disclosure.

FIG. 10 is a flow diagram illustrating a process for selecting a sampling rate in response to environmental variables in accordance with some embodiments of the present disclosure. Steps in the following discussion may be described with regard to the actions performed locally by sensor device 110. However, one or more alternative devices may instead perform the disclosed functions. For example, in an embodiment, computing device 120 may perform certain processing of environmental variables and/or selection of sampling rates locally (e.g., step 1040). Additionally, while the steps of process 1000 are shown in a particular order, the individual steps may be reordered or omitted.

In step 1010, process 1000 may receive, from at least one battery of sensor device 110, an indicator of a charge. For example, the at least one battery may include a voltmeter, an ammeter, or other device configured to measure a variable indicative of how much charge the at least one battery holds; how much power, voltage, current, and/or the like that at least one battery may produce over time; or the like. Accordingly, process 1000 may include receiving signals from the voltmeter, the ammeter, or the like. In some embodiments, step 1010 may further include processing signals from the voltmeter, the ammeter, or the like to determine the indicator of charge. For example, the processing may include extrapolation, over time, based on signals from the voltmeter, the ammeter, or the like and/or from historical data related to the at least one battery to determine an expected amount of time for which the at least one battery may charge the at least one battery.

In step 1020, process 1000 may receive, from at least one sensor of sensor device 110, measurements of at least one property indicative of an activity level of a user of sensor device 110. For example, the at least one sensor may comprise an accelerometer, a gyroscope, a compass, or any other device configured to measure one or more properties indicative of movement of sensor device 110. Accordingly, process 1000 may include receiving measurements from the accelerometer, the gyroscope, the compass, or the like. In some embodiments, step 1020 may further include processing the measurements. For example, the processing may include extrapolation of an activity score based on measurements of linear velocity and/or acceleration, angular velocity and/or acceleration, cardinal direction changes over time, or the like from the at least one sensor to determine a measure of activity level.

In step 1030, process 1000 may determine an available capacity of at least one memory of sensor device 110. For example, step 1030 may include determining the available capacity from a file allocation table of a FAT formatted memory, a master file table (MFT) of an NTFS formatted memory, a catalog file of an HFS formatted memory, or the like.

In step 1040, process 1000 may send a command to the at least one sensor to operate in a low-power mode or a high-power mode. For example, the low-power mode may have a lower sampling rate than the high-power mode. As described above, additional power modes may be used rather than two.

In the example of FIG. 10, the command may be based on the indicator of charge from the at least one battery, the available capacity of the at least one memory, and the indicator of activity level from the at least one sensor. In some embodiments, the command may be based on a sequential application of the indicators. For example, step 1040 may include selecting between a low-power mode and a medium-power mode based on the indicator of charge from the at least one battery when the indicator of activity level from the at least one sensor is below a threshold and selecting between a medium-power mode and a high-power mode based on the indicator of charge from the at least one battery when the indicator of activity level from the at least one sensor is above the threshold. In another example, step 1040 may include selecting between a low-power mode and a medium-power mode based on the available capacity of the at least one memory when the indicator of activity from the at least one sensor is below a threshold and selecting between a medium-power mode and a high-power mode based on the available capacity of the at least one memory when the indicator of activity level from the at least one sensor is above the threshold.

In other embodiments, the command may be based on a threshold applied to one indicator as adjusted by the other indicators. For example, step 1040 may include selecting between a low-power mode and a high-power mode based on the indicator of charge from the at least one battery as compared with a threshold that is lower when the available capacity of the at least one memory is higher and/or when the indicator of activity level from the at least one sensor is higher. In another example, step 1040 may include selecting between a low-power mode and a high-power mode based on the available capacity of the at least one memory as compared with a threshold that is lower when the indicator of charge from the at least one battery is higher and/or when the indicator of activity level from the at least one sensor is higher. In yet another example, step 1040 may include selecting between a low-power mode and a high-power mode based on the indicator of activity from the at least one sensor as compared with a threshold that is higher when the available capacity of the at least one memory is lower and/or when the indicator of charge from the at least one battery is lower.

In other embodiments, the command may be based a multi-factor analysis of the indicator of charge from the at least one battery, the available capacity of the at least one memory, and/or the indicator of activity from the at least one sensor. For example, a scoring algorithm (such as a weighted average or the like) applied to the indicator of charge from the at least one battery, the available capacity of the at least one memory, and/or the indicator of activity level from the at least one sensor may produce a score that is applied to one or more thresholds to select between power modes.

Although depicted using the indicator of charge from the at least one battery, the available capacity of the at least one memory, and the indicator of activity level from the at least one sensor, process 800 may use fewer indicators. Additionally or alternatively, process 800 may use additional indicators, such as an indicator of an strength of signal with a remote device (e.g., computing device 120), one or more environmental factors, or the like, as explained above.

Figure 11:
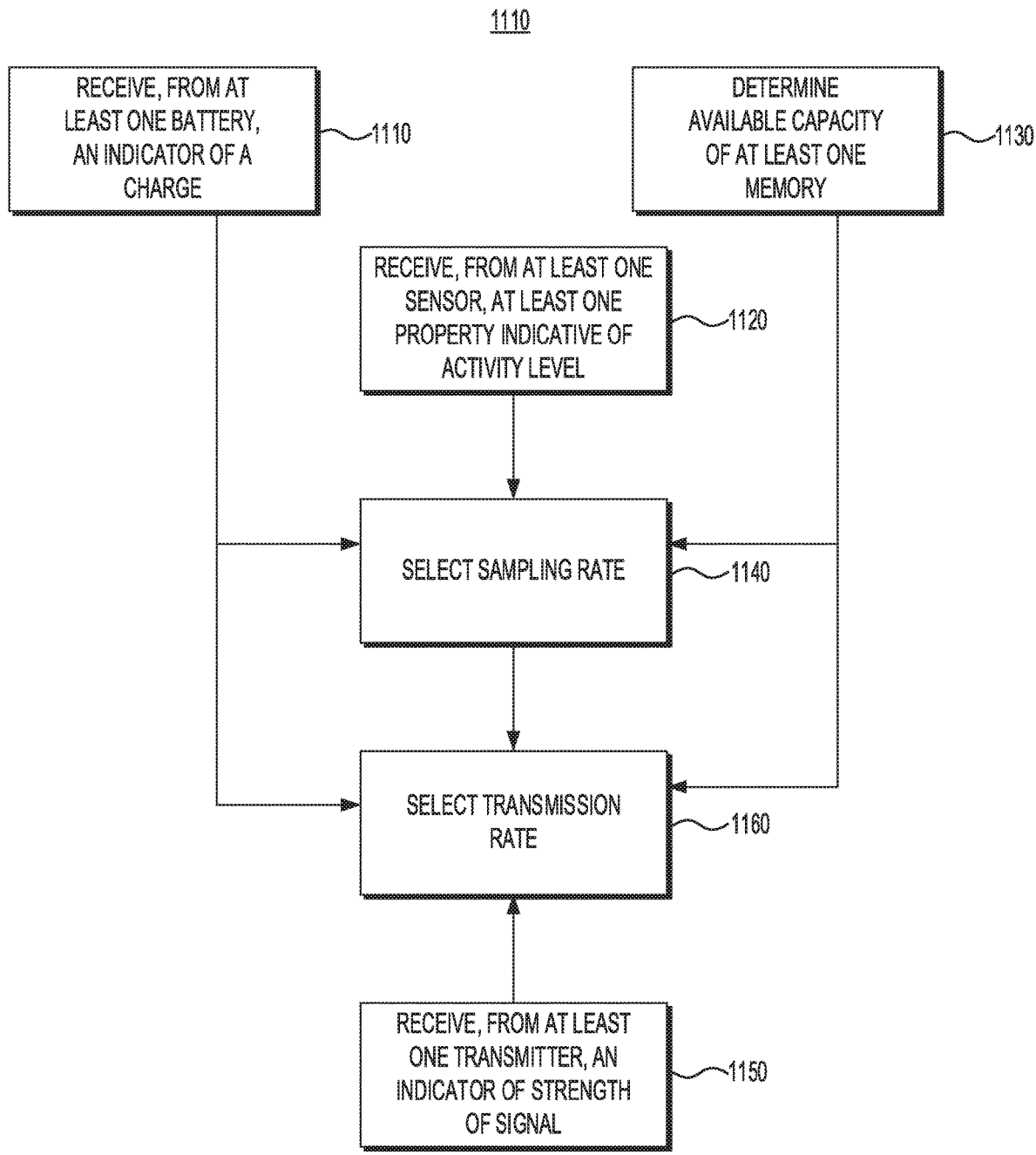
FIG. 11 is a flow diagram illustrating a process for selecting both a transmission rate and a sampling rate in response to environmental variables in accordance with some embodiments of the present disclosure.

FIG. 11 is a flow diagram illustrating a process for selecting a transmission rate and a sampling rate in response to environmental variables in accordance with some embodiments of the present disclosure. Steps in the following discussion may be described with regard to the actions performed locally by sensor device 110. However, one or more alternative devices may instead perform the disclosed functions. For example, in an embodiment, computing device 120 may perform certain processing of environmental variables and/or selection of transmission and sampling rates locally (e.g., steps 1140 and/or 1160). Additionally, while the steps of process 1100 are shown in a particular order, the individual steps may be reordered or omitted.

In step 1110, process 1100 may receive, from at least one battery of sensor device 110, an indicator of a charge. For example, the at least one battery may include a voltmeter, an ammeter, or other device configured to measure a variable indicative of how much charge the at least one battery holds; how much power, voltage, current, and/or the like that at least one battery may produce over time; or the like. Accordingly, process 1100 may include receiving signals from the voltmeter, the ammeter, or the like. In some embodiments, step 1110 may further include processing signals from the voltmeter, the ammeter, or the like to determine the indicator of charge. For example, the processing may include extrapolation, over time, based on signals from the voltmeter, the ammeter, or the like and/or from historical data related to the at least one battery to determine an expected amount of time for which the at least one battery may charge the at least one battery.

In step 1120, process 1100 may receive, from at least one sensor of sensor device 110, measurements of at least one property indicative of an activity level of a user of sensor device 110. For example, the at least one sensor may comprise an accelerometer, a gyroscope, a compass, or any other device configured to measure one or more properties indicative of movement of sensor device 110. Accordingly, process 1100 may include receiving measurements from the accelerometer, the gyroscope, the compass, or the like. In some embodiments, step 1120 may further include processing the measurements. For example, the processing may include extrapolation of an activity score based on measurements of linear velocity and/or acceleration, angular velocity and/or acceleration, cardinal direction changes over time, or the like from the at least one sensor to determine a measure of activity level.

In step 1130, process 1100 may determine an available capacity of at least one memory of sensor device 110. For example, step 1030 may include determining the available capacity from a file allocation table of a FAT formatted memory, a master file table (MFT) of an NTFS formatted memory, a catalog file of an HFS formatted memory, or the like.

In step 1140, process 1100 may send a command to the at least one sensor to operate in a low-power mode or a high-power mode. For example, step 1140 may be implemented similarly to step 1040 of process 1000, described above.

In step 1150, process 1100 may receive, from at least one transmitter of sensor device 110, an indicator of a strength of signal from a remote device (e.g., computing device 120). For example, the at least one transmitter may comprise a wireless transceiver, an antenna, or any other device configured to communicate over a wireless connection with the remote device. Accordingly, process 1100 may include receiving results of a connection test between the at least one transmitter and the remote device. In some embodiments, step 1150 may further include processing signals from the at least one transmitter. For example, the processing may include extrapolation based on signals indicative of a speed of connection, a proportion of lost packets to transmitted packets, or the like from the at least one transmitter to determine a measure of connection strength.

In step 1160, process 1100 may send a command to the at least one transmitter to operate in a low-power mode or a high-power mode. For example, the low-power mode may have at least one of a lower range of communication or a lower transmission rate than the high-power mode. As described above, additional power modes may be used rather than two.

In the example of FIG. 11, the command may be based on the selected power mode for the at least one sensor and the indicator of strength of signal from the at least one transmitter. In some embodiments, the command may be based on a sequential application of the sampling rate and the indicator of strength of signal. For example, step 1160 may include selecting between a low-power mode and a medium-power mode based on the sampling rate when the indicator of strength of signal from the at least one transmitter is below a threshold and selecting between a medium-power mode and a high-power mode based on the sampling rate when the indicator of strength of signal from the at least one transmitter is above the threshold.

In other embodiments, the command may be based on a threshold applied to the indicator as adjusted by the sampling rate or on a threshold applied to the sampling rate as adjusted by the indicator. For example, step 1160 may include selecting between a low-power mode and a high-power mode based on the indicator of strength of signal from the at least one transmitter as compared with a threshold that is lower when the sampling rate is higher. In another example, step 1160 may include selecting between a low-power mode and a high-power mode based on the sampling rate as compared with a threshold that is higher when the indicator of strength of signal from the at least one transmitter is lower.

In other embodiments, the command may be based a multi-factor analysis of the sampling rate and the indicator of strength of signal from the at least one transmitter. For example, a scoring algorithm (such as a weighted average or the like) applied to the sampling rate and the indicator of strength of signal from the at least one transmitter may produce a score that is applied to one or more thresholds to select between power modes.

Although depicted as selecting a power mode for the at least one transmitter based on the selected power mode for the at least one sensor, other embodiments may select a power mode for the at least one sensor based on a selected power mode for the at least one transmitter. For example, process 1100 may include selecting between a low-power mode and a medium-power mode for the at least one sensor based on the transmission rate when the indicator of activity level from the at least one sensor is below a threshold and selecting between a medium-power mode and a high-power mode based on the sampling rate when the indicator of activity level from the at least one sensor is above the threshold. In another example, process 1100 may include selecting between a low-power mode and a high-power mode for the at least one sensor based on the indicator of activity level from the at least one sensor as compared with a threshold that is lower when the transmission rate is higher. In yet another example, process 1100 may include applying a scoring algorithm (such as a weighted average or the like) to the transmission rate and the indicator of activity level from the at least one sensor to produce a score that is applied to one or more thresholds to select between power modes for the at least one sensor.

Other combinations of indicators may be used beside the combinations explained above. For example, a sampling rate may be selected based on an indicator of activity level and an available capacity of the at least one memory, and a transmission rate may be selected based on the selected sampling rate, an indicator of charge of the at least one battery, and/or an indicator of strength of signal. In another example, a transmission rate may be selected based on an available capacity of the at least one memory and an indicator of strength of signal, and a sampling rate may be selected based on the selected transmission rate, an indicator of charge of the at least one battery, and/or an indicator of activity level.

In other embodiments, the transmission rate and the sampling rate may be selected concurrently. For example, the transmission rate may be selected based on an indicator of charge of the at least one battery and/or an indicator of strength of signal from the at least one transmitter, and the sampling rate may be selected based on an available capacity of the at least one memory and/or an indicator of activity level from the at least one sensor. Accordingly, the transmission rate and the sampling rate may be selected based on different indicators. In some embodiments, the transmission rate and the sampling rate may be selected based on at least one same indicator. For example, the transmission rate may be selected based on an indicator of charge of the at least one battery, an indicator of activity level from the at least one sensor, and/or an indicator of strength of signal from the at least one transmitter, and the sampling rate may be selected based on an indicator of charge of the at least one battery, an available capacity of the at least one memory, and/or an indicator of activity level from the at least one sensor. Any combination of indicators described herein may be used to concurrently select the transmission rate and the sampling rate.

Examples

In some embodiments, particular low-power and high-power modes for transmission rates and/or sampling rates may apply depending on a context of an environment of sensor device 110. Although the examples below show a low-power mode and a high-power mode, any number of power modes for transmission rates and sampling rates may be used.

In one example, power modes of sensor device 110 may apply as follows in Example Table 2, which is not exclusive:

TABLE 2

(exemplary only)

| | Low-power Transmission | High-power Transmission |
|---|---|---|
| Low-power Sampling | Low activity level | Elder care |
| High-power Sampling | No wireless connection | Athletic training |

Additionally or alternatively, different contexts may include different low- and high-power modes. In one example, sensor device 110 may be used by an athlete during training. In such an example, possible combinations of transmission rates and sampling rates may include the following in Example Table 3, which is not exclusive:

TABLE 3

(exemplary only)

| | Low-power Transmission | High-power Transmission |
|---|---|---|
| Low-power Sampling | 400 Hz plus Bluetooth ® | 400 Hz plus LTE |
| High-power Sampling | 1 kHz plus Bluetooth ® | 1 kHz plus LTE |

In another example sensor device 110 may be used for elder care, e.g., to determine when a fall is likely to or has occurred. In such an example, possible combinations of transmission rates and sampling rates may include the following in Example Table 4, which is not exclusive:

TABLE 4

(exemplary only)

| | Low-power Transmission | High-power Transmission |
|---|---|---|
| Low-power Sampling | 100 Hz plus WiFi | 100 Hz plus LTE |
| High-power Sampling | 200 Hz plus WiFi | 200 Hz plus LTE |

In yet another example sensor device 110 may be used during physical therapy, e.g., after an injury, post-operation, or the like. In such an example, possible combinations of transmission rates and sampling rates may include the following in Example Table 4, which is not exclusive:

TABLE 4

(exemplary only)

| | Low-power Transmission | High-power Transmission |
|---|---|---|
| Low-power Sampling | 200 Hz plus Bluetooth ® Low Energy (LE) | 200 Hz plus Bluetooth ® Classic |
| High-power Sampling | 400 Hz plus Bluetooth ® LE | 400 Hz plus Bluetooth ® Classic |

The above low- and high-power sampling and transmission rates are exemplary only and not limiting of the embodiments disclosed herein.

Certain embodiments of this disclosure have been discussed with relation to a human skeletal system. However, the disclosed, calibration, kinematic data capture, and analysis techniques may be applied to any system with an expected or known baseline joint structure. In some embodiments, the disclosed methods may be applied to a sensor device (e.g., sensor device 110) mounted or attached to machine "skeletons" or structures (e.g., robotic equipment, computer numerical control (CNC) machine tools, robotically assisted surgery), animals (e.g., horses), partial human skeletons (e.g., amputees), and/or human skeletons with artificial limbs (e.g., prosthetics, orthotics). For each of these structural systems, a baseline map of possible or expected movements for each portion and/or the types of joints in them may be used to evaluate the movement of them using the previously discussed systems and methods.

It is intended that the disclosure and examples be considered as exemplary only, with a true scope and spirit of disclosed embodiments being indicated by the following claims.

What is claimed is:

1. A wearable apparatus having an adjustable sampling rate, comprising:

at least one battery;

at least one sensor configured to measure at least one property associated with a user of the wearable apparatus;

at least one memory storing measurements from the at least one sensor and instructions;

at least one transmitter configured to send data to a device remote from the wearable apparatus;

at least one processor configured to execute the instructions to perform operations comprising:

receiving, from the at least one battery, an indicator of a charge; determining an available capacity of the at least one memory; receiving, from the at least one sensor, indicator of activity of the user;

determining, using a scoring algorithm, a score based on the indicator of the charge, the available capacity, and the indicator of activity;

sending a command to the at least one transmitter to operate in a low-power mode or a high-power mode based on the determined score;

when the at least one transmitter is in the low-power mode, sending a periodic command to check a strength of signal from the remote device; and when a response to the periodic command from the at least one transmitter indicates the strength of signal is above a threshold, sending a command to the at least one transmitter to operate in the high-power mode for a predetermined period of time;

when the command is to operate in the low-power mode, sending a command to the at least one sensor to operate at a first sampling rate based on the determined score; and when the command is to operate in the high-power mode, sending a command to the at least one sensor to operate at a second sampling rate based on the determined score.

2. The wearable apparatus of claim 1, wherein the operations further comprise: weighting, using the scoring algorithm, the indicator of the charge, the available capacity, and the indicator of activity to determine the score.

3. The wearable apparatus of claim 1, wherein the operations further comprise: when the command is to operate in the low-power mode, reducing a frequency of uploads to the remote device.

4. The wearable apparatus of claim 3, wherein the at least one processor reduces the frequency of uploads only when the available capacity of the at least one memory exceeds a threshold.

5. The wearable apparatus of claim 1, wherein: the command further comprises a command to operate in a medium-power mode, and the medium-power mode has at least one of a range of communication or a transmission rate between those of the low-power mode and the high-power mode.

6. The wearable apparatus of claim 5, wherein the at least one processor selects a sampling rate for the at least one sensor based on the command to operate in the low-power mode, the medium-power mode, or the high-power mode.

7. The wearable apparatus of claim 1, wherein receiving, from the at least one sensor, indicator of activity of the user comprises extrapolating an activity score based on measurements of the at least one sensor.

8. The wearable apparatus of claim 1, wherein the operations further comprise selecting a power mode for the at least one sensor based on a power mode selected for the at least one transmitter.

9. The wearable apparatus of claim 1, wherein the second sampling rate is greater than the first sampling rate.

10. A method of selecting a sampling rate, comprising:

receiving, from at least one battery of a wearable device, an indicator of a charge;

determining an available capacity of at least one memory of the wearable device, the at least one memory storing measurements from at least one sensor configured to measure at least one property associated with a user of the wearable device;

receiving, from the at least one sensor, indicator of activity of the user;

determining, using a scoring algorithm, a score based on the indicator of the charge, the available capacity, and the indicator of activity;

sending a command to at least one transmitter to operate in a low-power mode or a high-power mode based on the determined score, the at least one transmitter being configured to send data to a device remote from the wearable device;

when the at least one transmitter is in the low-power mode, sending a periodic command to check a strength of signal from the remote device; and when a response to the periodic command from the at least one transmitter indicates the strength of signal is above a threshold, sending a command to the at least one transmitter to operate in the high-power mode for a predetermined period of time;

when the command is to operate in the low-power mode, sending a command to the at least one sensor to operate at a first sampling rate based on the determined score; and when the command is to operate in the high-power mode, sending a command to the at least one sensor to operate at a second sampling rate based on the determined score.

11. The method of claim 10, further comprising: weighting, using the scoring algorithm, the indicator of the charge, the available capacity, and the indicator of activity to determine the score.

12. The method of claim 10, further comprising: when the command is to operate in the low-power mode, reducing a frequency of uploads to the remote device.

13. The method of claim 12, further comprising reducing the frequency of uploads only when the available capacity of the at least one memory exceeds a threshold.

14. The method of claim 10, wherein:

the command further comprises a command to operate in a medium-power mode, and the medium-power mode has at least one of a range of communication or a transmission rate between those of the low-power mode and the high-power mode.

15. The method of claim 14, further comprising selecting a sampling rate for the at least one sensor based on the command to operate in the low-power mode, the medium-power mode, or the high-power mode.

16. The method of claim 10, wherein receiving, from the at least one sensor, indicator of activity of the user comprises extrapolating an activity score based on measurements of the at least one sensor.

17. The method of claim 10, further comprising selecting a power mode for the at least one sensor based on a power mode selected for the at least one transmitter.

18. The method of claim 10, wherein the second sampling rate is greater than the first sampling rate.

* * * * *